(12) United States Patent
Lee et al.

(10) Patent No.: US 11,211,832 B2
(45) Date of Patent: Dec. 28, 2021

(54) FOREIGN OBJECT DETECTOR AND WIRELESS CHARGING APPARATUS

(71) Applicant: LG ELECTRONICS INC., Seoul (KR)

(72) Inventors: Byunghyuk Lee, Seoul (KR); Jongseok Baek, Seoul (KR); Yongnam Cho, Seoul (KR); Bohwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 366 days.

(21) Appl. No.: 16/294,734

(22) Filed: Mar. 6, 2019

(65) Prior Publication Data
US 2019/0280533 A1 Sep. 12, 2019

(30) Foreign Application Priority Data
Mar. 7, 2018 (KR) .................. 10-2018-0027039

(51) Int. Cl.
| | | |
|---|---|---|
| *H02J 50/60* | (2016.01) | |
| *G01V 3/08* | (2006.01) | |
| *H02J 50/10* | (2016.01) | |
| *H02J 7/02* | (2016.01) | |

(52) U.S. Cl.
CPC .............. *H02J 50/60* (2016.02); *G01V 3/087* (2013.01); *H02J 7/025* (2013.01); *H02J 50/10* (2016.02)

(58) Field of Classification Search
CPC ...................................................... H02J 50/60
USPC ........................................................ 320/108
See application file for complete search history.

(56) References Cited

U.S. PATENT DOCUMENTS

| | | | | |
|---|---|---|---|---|
| 10,361,594 B2* | 7/2019 | Huang | ............ | H02J 50/60 |
| 2013/0169062 A1* | 7/2013 | Maikawa | ............ | H02J 50/60 |
| | | | | 307/104 |
| 2014/0111019 A1 | 4/2014 | Roy et al. | | |
| 2015/0311725 A1* | 10/2015 | Yamamoto | ............ | H02J 50/10 |
| | | | | 307/104 |
| 2015/0323694 A1* | 11/2015 | Roy | ............ | H02J 7/025 |
| | | | | 307/104 |
| 2015/0362614 A1* | 12/2015 | Obayashi | ............ | H02J 50/12 |
| | | | | 324/207.17 |
| 2016/0006260 A1* | 1/2016 | Nakamura | ............ | G01V 3/104 |
| | | | | 307/104 |
| 2016/0282500 A1* | 9/2016 | Filippenko | ............ | G01V 3/104 |
| 2018/0054091 A1 | 2/2018 | Liu et al. | | |

FOREIGN PATENT DOCUMENTS

| | | |
|---|---|---|
| JP | 2013-192390 A | 9/2013 |
| KR | 10-2014-0057013 A | 5/2014 |

* cited by examiner

*Primary Examiner* — Jerry D Robbins
(74) *Attorney, Agent, or Firm* — Birch, Stewart, Kolasch & Birch, LLP

(57) ABSTRACT

A foreign object detector for detecting a foreign object between a transmission pad and a reception pad of a wireless charging system can include a plurality of object detectors; and a detection circuit configured to detect an object based on data received from the plurality of object detectors, in which each of the plurality of object detectors includes a first coil part including a coil wound in a first rotation direction; and a second coil part stacked on the first coil part and including a coil wound in a second rotation direction different from the first rotational direction, and in which each of the plurality of object detectors is connected in series or in parallel with one another.

20 Claims, 37 Drawing Sheets

100

10

20

OVERALL LENGTH DIRECTION

OVERALL WIDTH DIRECTION

OVERALL HEIGHT
DIRECTION

OVERALL WIDTH
DIRECTION

FOREIGN OBJECT DETECTOR AND WIRELESS CHARGING APPARATUS

CROSS-REFERENCE TO RELATED APPLICATION

This application claims the priority benefit of Korean Patent Application No. 10-2018-0027039, filed on Mar. 7, 2018 in the Korean Intellectual Property Office, the disclosure of which is incorporated herein by reference.

BACKGROUND OF THE INVENTION

1. Field of the Invention

The present invention relates to a foreign object detector and a wireless charging apparatus in a wireless charging system.

2. Description of the Related Art

Along with studies on electronic devices, wireless charging systems for supplying electrical energy to the electronic devices are being studied and researched as well.

Many companies and institutes are focusing on developing a wireless charging system for a mobile terminal and a wireless charging system for an electric vehicles.

If a metal foreign object exists between a transmitter and a receiver during wireless charging, temperature in the system increases and this may result in a fire.

In order to detect such a foreign object, various foreign object detecting methods, for example, installing a camera, have been introduced, but these methods lack detection reliability.

SUMMARY OF THE INVENTION

The present invention has been made in view of the above problems, and it is one object of the present invention to provide a foreign object detector with reliability for detection of a foreign object.

It is another object of the present invention to provide a wireless charging apparatus including the foreign object detector.

Objects of the present invention should not be limited to the aforementioned objects and other unmentioned objects will be clearly understood by those skilled in the art from the following description.

In accordance with an embodiment of the present invention, the above and other objects can be accomplished by the provision of a wireless charging apparatus including: a plurality of object detectors connected in series or in parallel with each other; and a detection circuit configured to determine, based on data received from the plurality of object detectors, whether a foreign object exists.

The details of other embodiments are included in the following description and the accompanying drawings.

The embodiments of the present invention have one or more effects as follows.

First, it is possible to provide a foreign object detector which is inexpensive and easy to install Second, due to high detection sensitivity, it is possible to detect even a small-sized foreign object and increase reliability for detection of a foreign object.

Third, it is possible to detect a foreign object regardless of whether a device is being charged.

Fourth, as an induced voltage to be induced to a coil during charging is cancelled, detection sensitivity may improve.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein:

With reference to FIGS. 12 and 13, a plurality of object detectors which cancels a small amount of an induced voltage will be described;

DETAILED DESCRIPTION OF THE EMBODIMENTS

Figure 1:
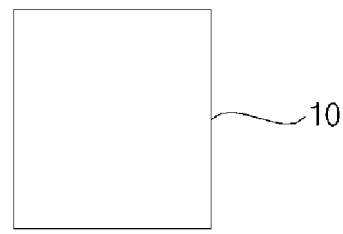
FIG. 1 is a diagram illustrating an exterior of a wireless charging system according to an embodiment of the present invention.
Figure 1:
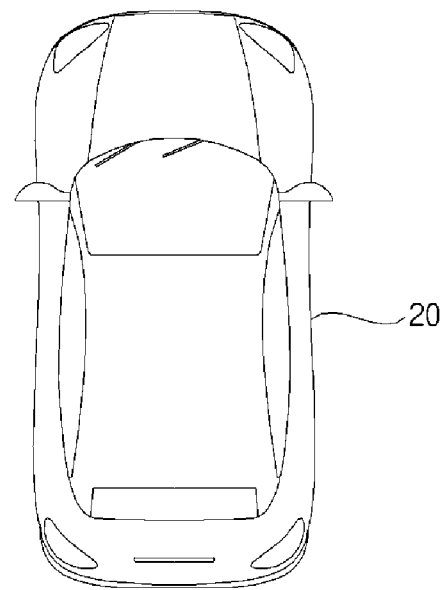

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a diagram illustrating an exterior of a wireless charging system according to an embodiment of the present invention.

Figure 2:
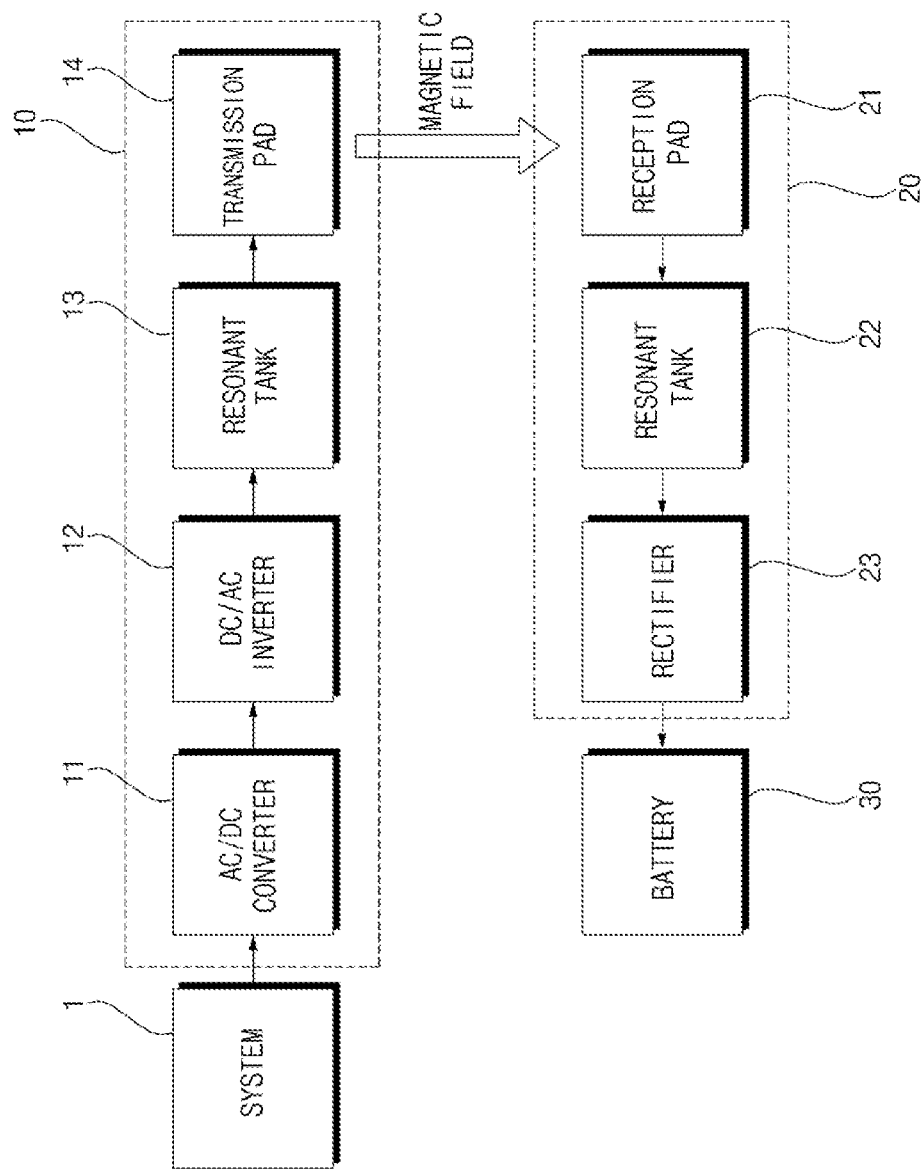
FIG. 2 is a block diagram illustrating a wireless charging system according to an embodiment of the present invention.

FIG. 2 is a block diagram illustrating a wireless charging system according to an embodiment of the present invention.

Referring to the drawings, a wireless charging system 100 may include a power transmitting apparatus 10 and a power receiving apparatus 20.

The wireless charging system 100 may be used for wireless charging of an electric vehicle battery, wireless charging of a mobile terminal battery, etc.

In the case where the wireless charging system 100 is used for wireless charging of an electric vehicle battery, the power transmitting apparatus 10 may be installed in a charging station and the power receiving apparatus 20 may be provided in a vehicle.

In the case where the wireless charging system 100 is used for wireless charging of a mobile terminal battery, the power transmitting apparatus 10 may be in a portable form and the power receiving apparatus 20 may be provided in a mobile terminal.

In some implementations, the power transmitting apparatus 10 may be provided in a vehicle to configure a wireless charging system together with a mobile terminal having the power receiving apparatus 20.

The power transmitting apparatus 10 may include an AC/DC converter 11, a DC/AC inverter 12, a resonant tank 13, and a transmission pad 14.

The AC/DC converter 11 may convert AC electrical energy provided from a system 1 into DC electrical energy.

The DC/AC converter 12 converts DC electrical energy into AC electrical energy. In this case, the DC/AC converter 12 may generate a high frequency signal ranging from tens to hundreds kHz.

The resonant tank 13 compensates impedance to fit wireless charging.

The transmission pad 14 wirelessly transmits electrical energy.

The transmission pad 14 has a transmission coil 15 included therein.

The power receiving apparatus 20 may include a reception pad 21, a resonant tank 22, and a rectifier 23.

The reception pad 23 receives electrical energy wirelessly.

The reception pad 23 has a reception coil 25 included therein.

The transmission pad 14 and the reception pad 23 include a set of coils having magnetic coupling (the transmission coil 15 and the reception coil 25).

The transmission pad 14 and the reception pad 23 transmits electrical energy, without electrical contact between physical electrodes, by use of a magnetic field occurring due to a high-frequency driving signal.

In the case where there is a foreign object between the transmission pad 14 and the reception pad 23, Eddy current loss occurs. In this case, there are risks of accident, such as firing.

The resonant tank 22 compensates for impedance to fit wireless charging.

The rectifier 21 converts AC electrical energy into DC electrical energy to supply the DC electrical energy to a battery 30.

The battery 30 may be provided in a vehicle or a mobile terminal.

Figure 3:
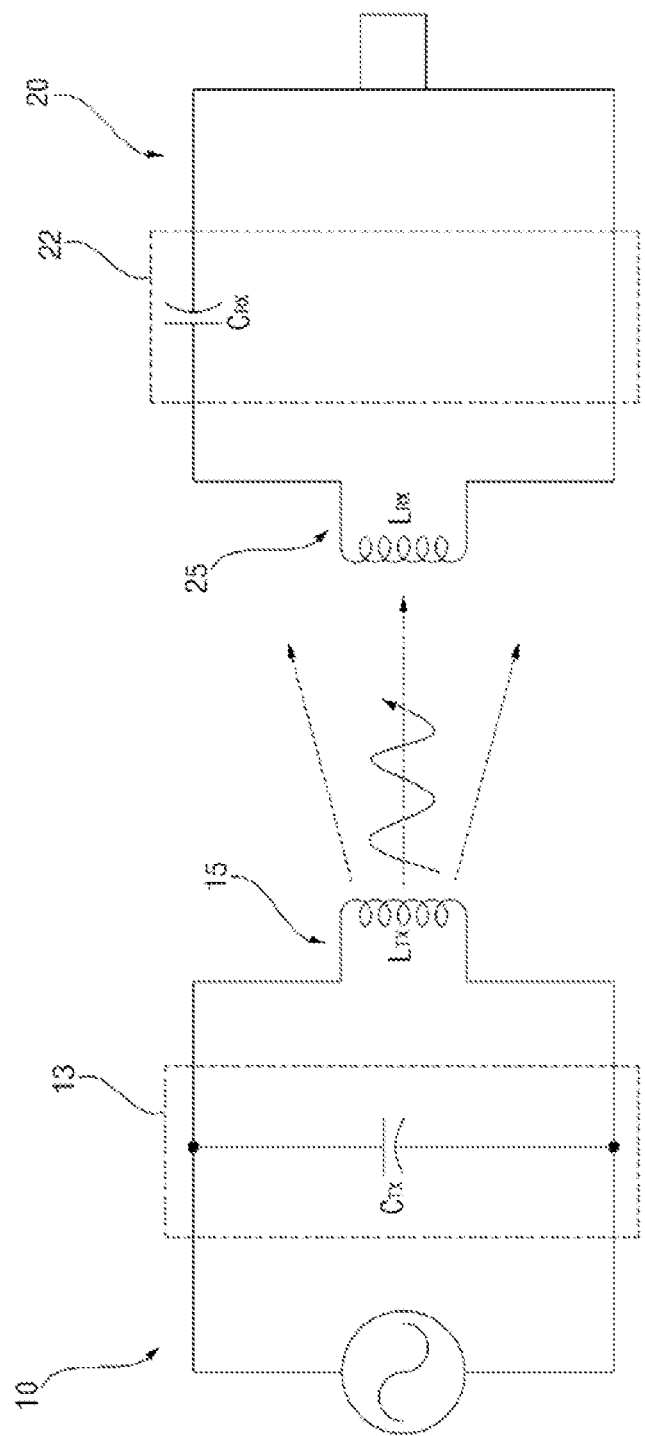
FIG. 3 is a diagram for explaining a wireless charging method according to an embodiment of the present invention.

FIG. 3 is a diagram for explaining a wireless charging method according to an embodiment of the present invention.

Referring to FIG. 3, a wireless charging system may use inductive coupling or resonance coupling.

Inductive coupling works on the principle that, when intensity of a current flowing in a primary coil between two adjacent coils is changed, a magnetic field is changed by the current and in turn a magnetic flux passing through a secondary coil is changed to thereby generate an induced electromotive force on the side of the secondary coil. That is, if two coils are placed close to each other and only a current of the primary coil is changed, an induced electromotive force may be generated even though two wires are not moved spatially. In this case, frequency properties are not greatly affected, but power efficiency may be affected depending on the alignment and distance of a transmitter apparatus (e.g., a wireless charging apparatus) including each coil and a receiving apparatus (e.g., a mobile terminal).

Resonance coupling works on the principle that, when two coils are at a specific distance, a resonant frequency is applied to a primary coil between the two coils to thereby generate variation of a magnetic field and some of the variation is applied to a secondary coil having the same resonant frequency to thereby generate an induced electromotive force. According to this method, if a transmitter and a receiver resonate at the same frequency, a magnetic wave is transferred through a near magnetic field. Thus, if the transmitter and the receiver have different frequencies, energy is not transferred therebetween. In this case, selecting a frequency may be a crucial issue. Since energy is not transferred between resonant frequencies spaced apart a predetermined distance or more from each other, it is possible to select a target device to charge by selecting a resonant frequency. If only one device is allocated for each resonant frequency, selecting a resonant frequency may mean selecting a target device to charge.

Resonant coupling has an advantage over inductive coupling that the alignment and distance of a transmitting apparatus including each coil and a receiving apparatuses including have less impact on power efficiency.

Figure 4:
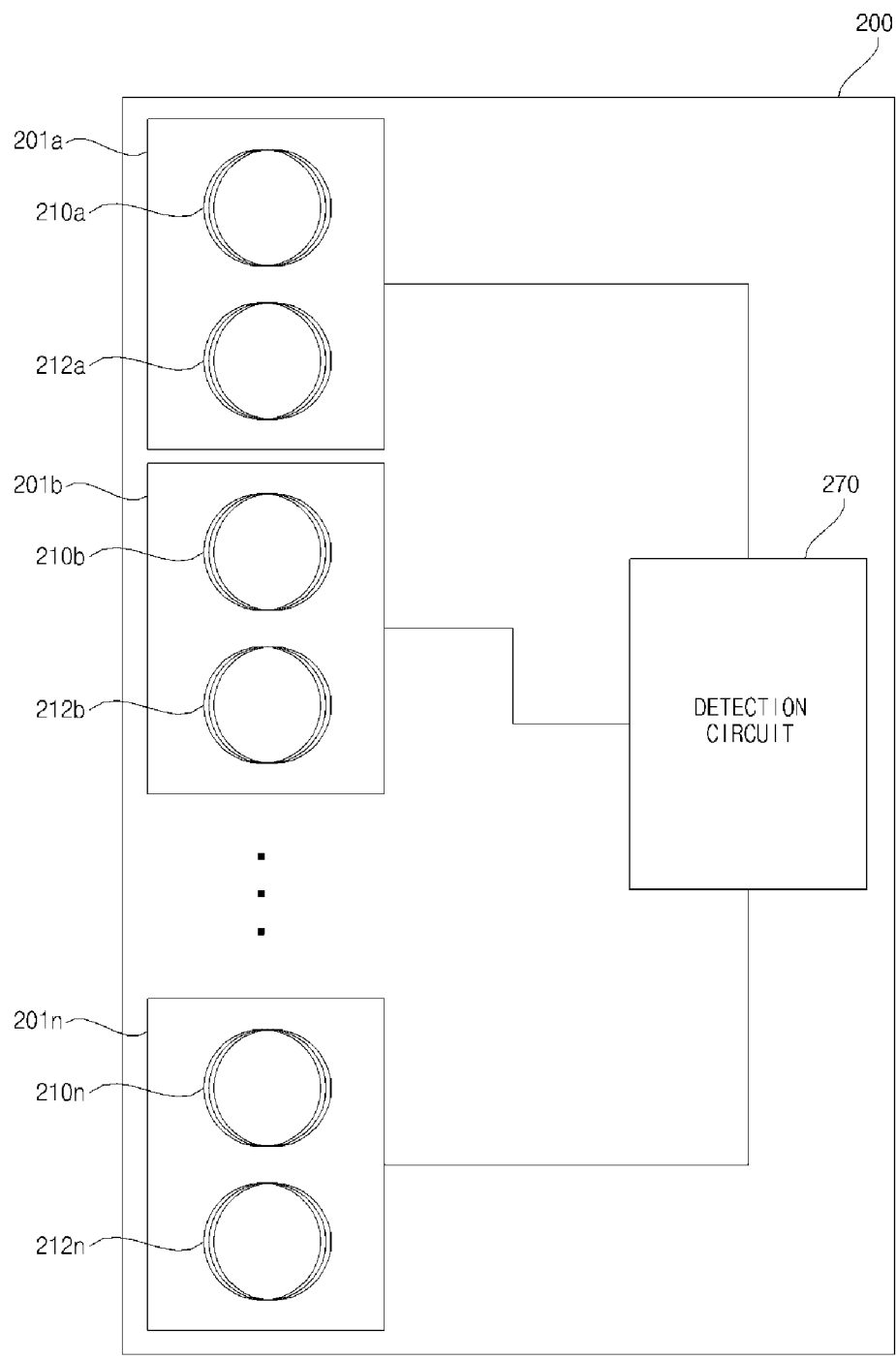
FIG. 4 is a diagram for explaining a foreign object detector according to an embodiment of the present invention.

FIG. 4 is a diagram for explaining a foreign object detector according to an embodiment of the present invention.

Figure 5:
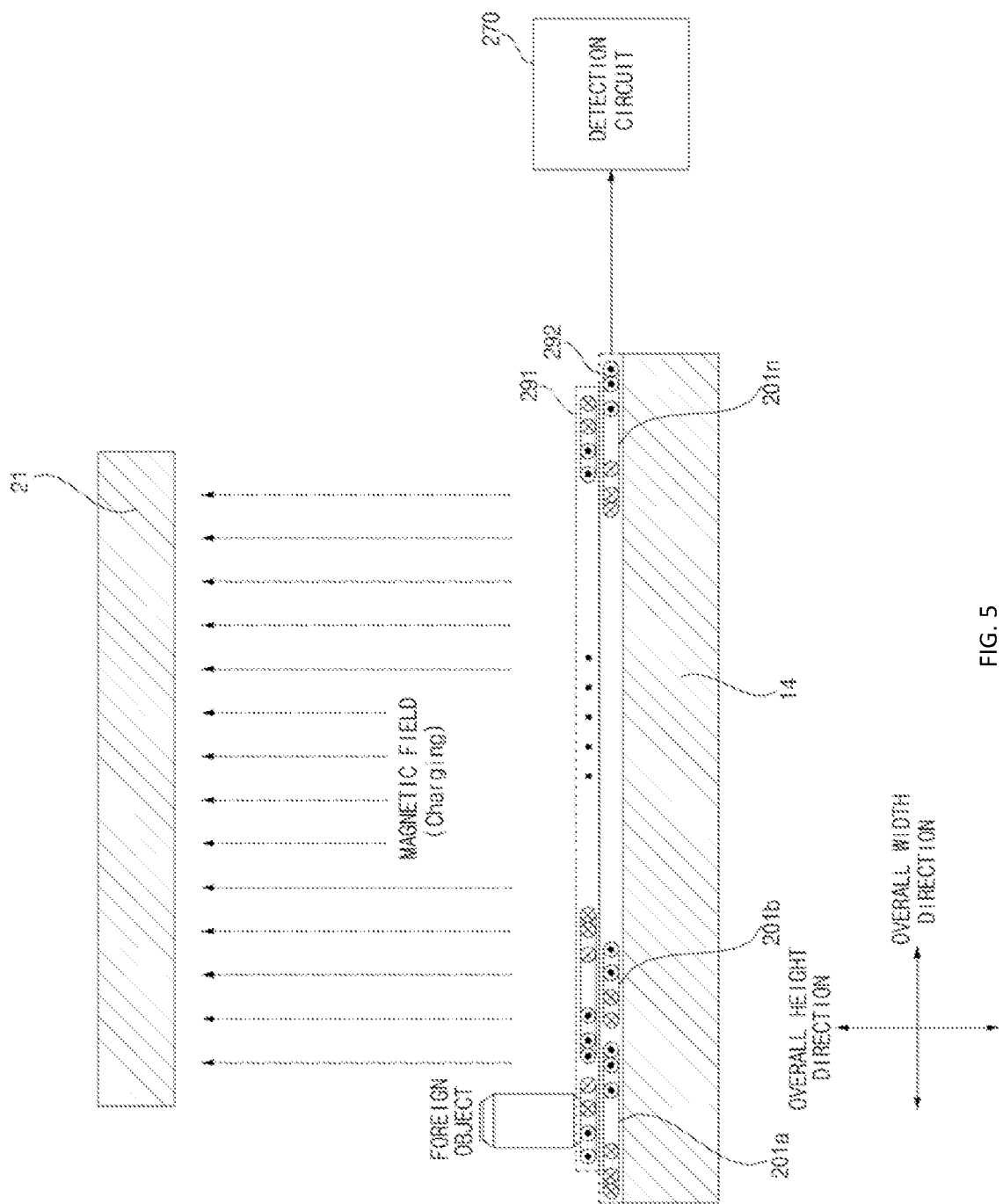
FIG. 5 is a diagram illustrating system configuration of a foreign object detector according to an embodiment of the present invention.

FIG. 5 is a diagram illustrating system configuration of a foreign object detector according to an embodiment of the present invention.

Referring to FIGS. 4 and 5, a foreign object detector 200 may include a plurality of object detectors 201a, 201b, ..., 201n (hereinafter, 201) and a detection circuit 270.

The plurality of object detectors 201 may be provided between a transmission pad 14 and a reception pad 21.

For example, the plurality of object detectors 201 may be provided on the transmission pad 14.

For example, the plurality of object detector 201 may be provided on the reception pad 21.

The plurality of object detectors 201 may cover the transmission pad 14.

For example, the transmission pad 14 may be formed in a rectangular shape. A second coil part 212 of the plurality of object detectors 201 may be formed in a polygonal shape. A combination of the plurality of polygonal object detectors 201 may fully cover a rectangular transmission pad 14.

For example, the reception pad 21 may be formed in a rectangular shape. The second coil part 212 of the plurality of object detector 201 may be formed in a polygonal shape. A combination of the plurality of object detector 201 may fully cover a rectangular reception pad 21.

The plurality of object detector 201 may detect an object.

The object may be defined as a metal foreign substance that is located between the transmission pad 14 and the reception pad 21.

In the case where a metal foreign substance is located between the transmission pad 14 and the reception pad 21, charging may not be performed smoothly and degradation may occur, thereby resulting in a safety problem.

Each of the plurality of object detectors 201 may include: a first coil part 210a, 210b, ..., 210n (hereinafter, 210); and a second coil part 212a, 212b, ..., 212n (hereinafter, 212).

In the first coil part 210, a coil may be wound in a first rotational direction.

In the first coil part 210, the coil may be wound a specific number of times in the first rotational direction.

In the first coil part 210, the coil may be wound the number of times greater than the number of times a coil is wound in the second coil part 212.

For example, the number of coil windings of the first coil part 210 may be determined on the basis of a value that is obtained by multiplying the number of coil windings of the second coil part 212 by a ratio of an area of a first shape to an area of a second shape. The first shape may be a shape defined by coil windings in the first coil 210. The second shape may be a shape defined by coil winding in the second coil part 212.

The first coil part 210 may be referred to as a detection coil part.

The first coil part 210 has a predetermined impedance. In the case where a metal foreign substance is located around the first coil part 210, a change occurs in the impedance of the first coil part 210 from a perspective view in the outside.

In the second coil part 212, a coil may be wound in a second rotational direction. The second rotational direction may be different from the first rotational direction. The second rotational direction may be a rotational direction opposite to the first rotational direction.

In the second coil part 212, the coil may be wound a specific number of times in the second rotational direction.

Meanwhile, the number of times a coil is wound may be referred to as turns.

The first coil part 210 and the second coil part 212 may be stacked alternatively.

For example, the second coil part 212 may be stacked on the first coil part 210.

For example, the first coil part 210 may be stacked on the second coil part 212.

For example, the first coil part 210 and the second coil part 212 may be stacked, so that the center of the first shape defined by coil windings in the first coil part 210, and the center of the second shape defined by coil windings in the second coil part 212 coincide with each other. For example, a virtual line connecting the center of the first shape and the center of the second shape may be perpendicular to the ground surface.

The second coil part 212 may be referred to as an induced voltage cancellation coil part.

The plurality of object detection apparatuses 201 may be composed of a plurality of layers.

For example, the first coil part 210 and the second coil part 212 may be disposed alternatively to form a first layer 291.

For example, the second coil part 212 and the first coil part 210 may be disposed alternatively to form a second layer 292.

For example, in the case where the first coil part 210 is disposed at a first point of the first layer 291, the second coil part 212 may be disposed at a second point of the second layer 292. In this case, the center of the first shape of the first coil part 210 and the center of the second shape of the second coil part 212 may coincide with each other.

For example, in the case where the second coil part 212 is disposed at a first point of the second layer 292, the first coil part 210 may be disposed at a second point of the first layer 291. In this case, the center of the second shape of the second coil part 212 and the center of the first shape of the first coil part 210 may coincide with each other.

The plurality of object detectors 201 may be connected in series or in parallel with one another.

The electrical connected structure of the plurality of object detectors 201 will be described later with reference to drawings from FIG. 12A The detection circuit 270 may be electrically connected to the plurality of object detectors 201.

The detection circuit 270 may determine whether an object exists, based on data received from the plurality of object detectors 201.

The detection circuit 270 may determine whether an object exists, based on change in impedance of the first coil part 210.

For example, the detection circuit 270 may determine whether an object exists, based on a signal output from the first coil part 210 due to an oscillator.

For example, the detection circuit 270 may determine whether an object exists, based on a signal output from the first coil part 210 due to switching of a DC voltage.

For example, the detection circuit 270 may determine whether an object exists, based on a value of induced voltage occurring in the object detector 201.

As the second coil part 212 is provided, an induced voltage occurring due to power transmission may be canceled. If a foreign substance exists when the induced voltage is canceled, an induced voltage may occur. In this case, the detection circuit 270 is able to detect whether an object exists, based on the induced voltage which has occurred.

Figure 6:
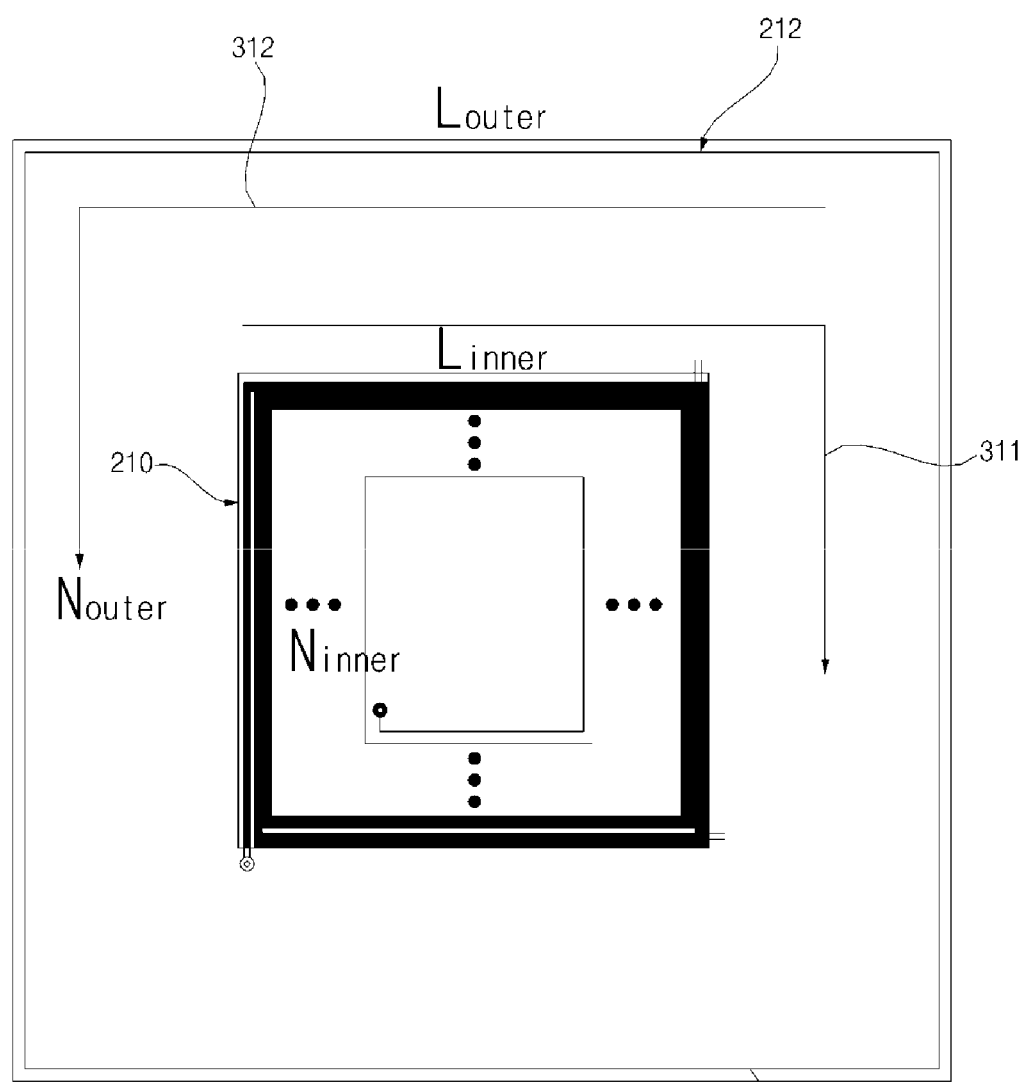
FIG. 6 is a plan view of an object detector according to an embodiment of the present invention.

FIG. 6 is a plan view of an object detector according to an embodiment of the present invention.

Figure 7:
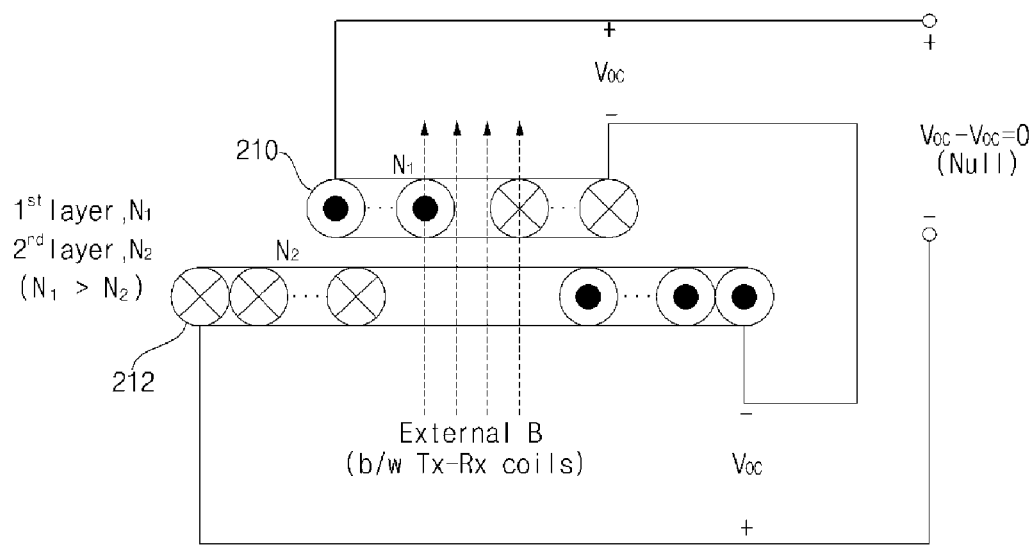
FIG. 7 is a side view of an object detector according to an embodiment of the present invention.

FIG. 7 is a side view of an object detector according to an embodiment of the present invention.

Referring to FIGS. 6 and 7, in the first coil part 210, a coil may be wound in a first direction 311.

For example, the first direction 311 may be a clock-wise direction.

The first coil part 210 may be wound a specific number of times in the first rotational direction 311.

In the first coil part 210, the coil may be wound the number of times greater than the number of times a coil is wound in the second coil 212.

The first coil part 210 mat have a first shape having a first area.

The first shape may be defined as a shape that has the first area due to winding of the coil in the first coil part 210.

In FIG. 6, the first shape is exemplified as a rectangle, but aspects of the present invention are not limited thereto, and the first shape may be a polygon, a circle, or an ellipse.

The first shape may be smaller than a second shape that is defined by coil windings in the second coil 212. That is, the first area may be smaller than the second area.

The number of windings of the first coil part 210 may be determined by the number of windings of the second coil 212.

For example, the number of windings of the first coil 210 may be determined on the basis of a value that is obtained by multiplying the number of windings of the second coil part 212 by a ratio of the area of the first shape to the area of the second shape.

Due to this characteristics, it is possible to maximize object detection sensitivity, while canceling an induced voltage caused by a charging magnetic field without cancelling inductance of the object detection apparatus.

As illustrated in FIG. 6, the first shape may be a first rectangle.

A length of one side of the first rectangle may be ½ times a length of one side of a second rectangle.

Meanwhile, the first shape may be different from the second shape.

For example, the first shape may be a rectangle and the second shape may be a hexagon.

For example, the first shape may be a hexagon and the second shape may be a rectangle.

For example, the first shape may be a circle and the second shape may be a rectangle or a hexagon.

The first shape and the second shape may be determined by object detection sensitivity and shapes of a reception pad and a transmission pad.

In the second coil 212, a coil may be wound in a second direction 312. The second direction 312 may be different from the first direction 311.

For example, the second direction 312 may be a counter-clockwise direction.

In the second coil part 212, the coil may be wound a specific number of times in the second direction 312.

Meanwhile, the number of times a coil is wound may be referred to the number of turns.

The second coil part 212 may have a second shape having a second area.

The second shape may be defined as a shape that has the second area due to winding of the coil in the second coil part 212.

In FIG. 6, the second shape is exemplified as a rectangle, but aspects of the present invention is not limited thereto, and the second shape may be a polygon, a circle, or an ellipse.

The second shape may be greater than the first shape that is defined by coil windings in the first coil part 210. That is, the second area may be greater than the first area.

As shown in FIG. 6, the second shape may be a second rectangle greater than a first rectangle.

As such, as the first shape and the second shape are a rectangular shape, respectively, it is advantageous to entirely cover the rectangular-shaped transmission pad 14 and the rectangular-shaped reception pad 21 with the plurality of detectors 201.

A length of one side of the second rectangle may be two times greater than a length of one side of the first rectangle.

Due to this characteristic, it is possible to entirely cover the rectangular-shaped transmission pad 14 and the rectangular-shaped reception pad 21 without a dead zone.

The dead zone may be a region in which an object is not sensed.

The coil of the second coil part 212 may be wound in a region other than a region in which the first coil part 210 is stacked.

The coil of the second coil part 212 may be wound in an outer region of the second shape.

The coil of the second coil 212 may be wound to be spaced apart at a maximum distance from the first coil part 210.

In the second coil part 212, the coil may be wound once to three times.

If the coil is wound four times or more, it may reduce the total inductance value of the object detection apparatuses 201, thereby reducing object detection sensitivity.

As illustrated in FIG. 7, the number N1 of winding of the first coil 210 may be greater than the number N2 of winding of the second coil 212.

In addition, the area of the second shape of the second coil 212 may be greater than the area of the first shape of the first coil part 210.

For this reason, an induced voltage formed in the object detectors 201 may be cancelled by a voltage applied to each of the first coil part 210 and the second coil part 212.

Figure 8:
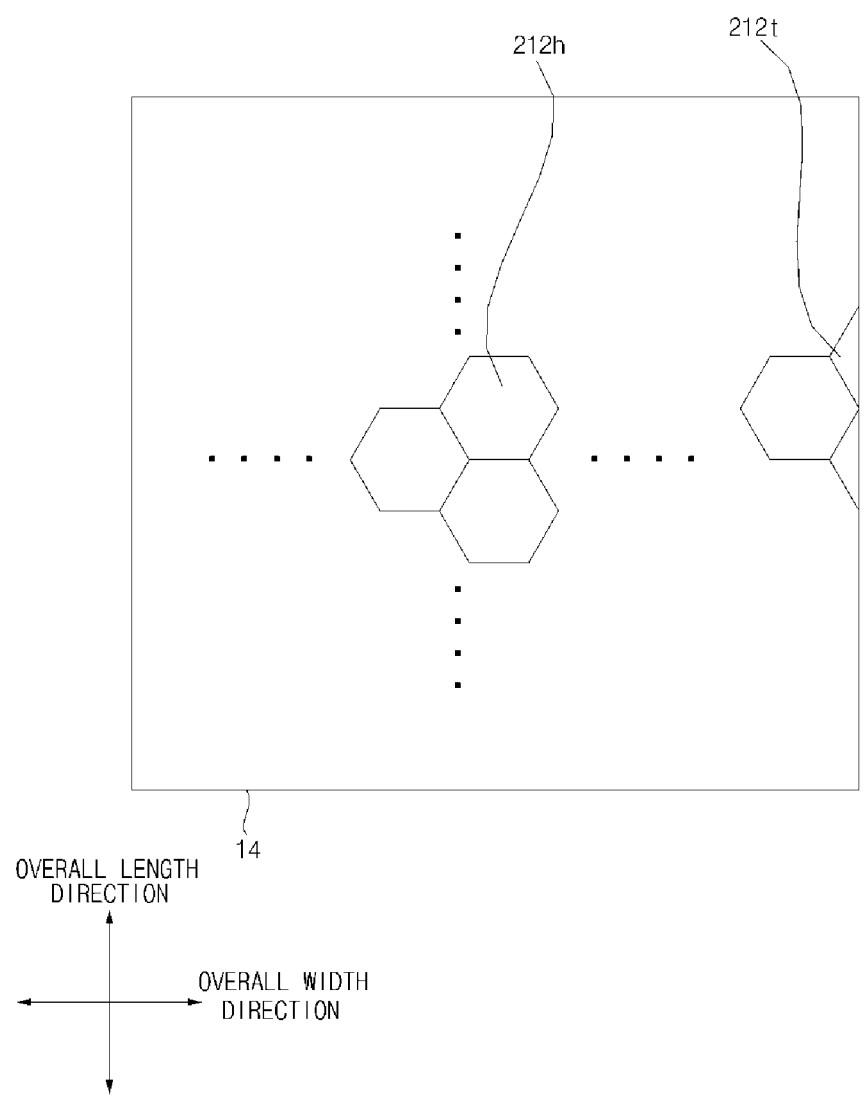
FIG. 8 shows an example of a shape of a second coil part according to an embodiment of the present invention.

FIG. 8 shows an example of a shape of a second coil part according to an embodiment of the present invention.

Referring to FIG. 8, the transmission pad 14 may have a rectangular shape.

A second shape defined by coil windings in the second coil 212 may be at least one of a hexagon or a triangle.

Some of the plurality of object detectors 201 may include a hexagonal second coil part 212h.

The rest of the plurality of object detectors 201 may include a triangular second coil part 212t.

A region of the transmission pad 14 not covered by a plurality of hexagonal second coil part 212h may be covered by a plurality of triangular second coil part 212t.

As such. Due to the alignment of the plurality of hexagonal second coil parts 212h and the plurality of triangular second coil part 212t, the entire region of the transmission pad 14 may be covered. Accordingly, there is no dead zone in which an object is not detected, and therefore, an object detection rate may be increased.

Figure 9:
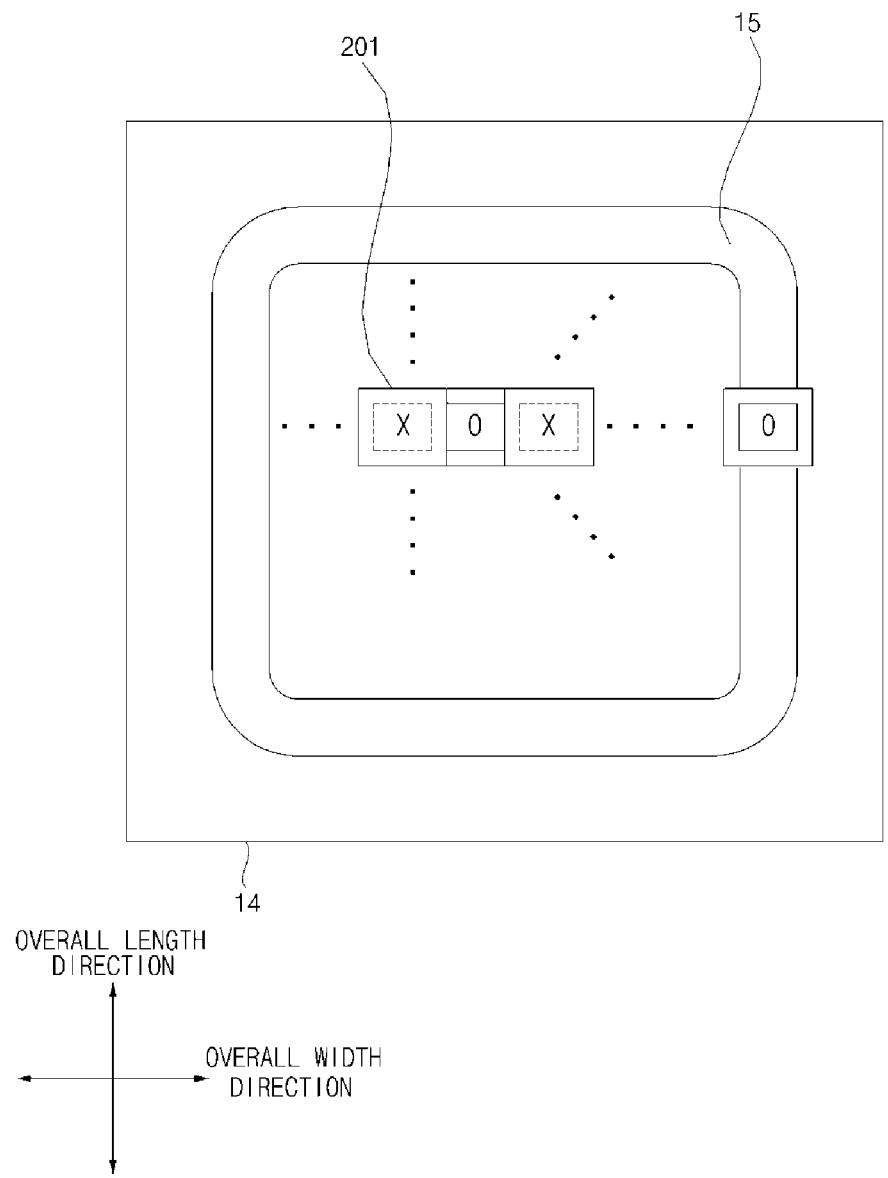
FIG. 9 shows an example of an object detection apparatus on a charging pad according to an embodiment of the present invention.

FIG. 9 shows an example of an object detection apparatus on a charging pad according to an embodiment of the present invention.

Referring to FIG. 9, the transmission pad 14 includes a transmission coil 15.

The number of winding of the first coil part 210 may be determined by a position of the first coil part 210 on the transmission pad 14.

When the first coil part 210 is disposed on the transmission coil 15 of the transmission pad 14, the number of windings of the first coil part 210 may be greater than when the first coil part 210 is not provided on the transmission coil 15.

For example, in the case where the first coil part 210 is provided on the transmission coil 15 of the transmission pad 14, the number of windings of the first coil 210 may be 17 turns.

For example, in the case where the first coil part 210 is not provided on the transmission coil 15 of the transmission pad 14, the number of windings of the first coil part 210 may be 14 turns.

For the foreign substance detection apparatus 200, the transmission coil 15 is the cause of noise. By increasing the number of windings of the first coil 210 on a transmission coil 15 in which noise is highly likely to occur, it is possible to increase an object detection rate.

The number of windings of the second coil part 212 may be determined by a position of the second coil part 212 on the transmission pad 14.

When the second coil part 212 is provided on the transmission coil 15 of the transmission pad 14, the number of windings of the second coil part 210 may be smaller than when the second coil part 212 is not provided on the transmission coil 15.

For example, in the case where the second coil part 212 is provided on the transmission coil 15 of the transmission pad 14, the number of windings of the second coil part 12q may be one turn.

For example, in the case where the second coil part 212 is not provided on the transmission coil 15 of the transmission pad 14, the number of windings of the second coil part 212 may be two turns.

An inductive voltage is formed by a magnetic field generated by the transmission coil 15. In this case, more magnetic fields occurs inside the transmission coil 15 than above the transmission coil 15. By increasing the number of windings when the second coil part 212 is not provided on the transmission coil 15 than when the second coil part 212 is not provided on the transmission coil 15, it is possible to efficiently cancel the induced voltage.

Figure 10:
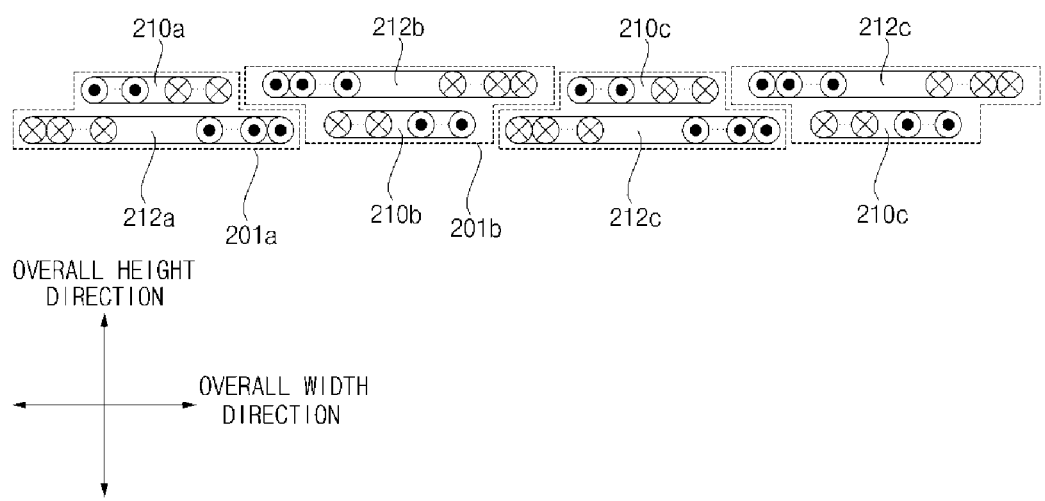
FIG. 10 shows an example of a plurality of object detectors according to an embodiment of the present invention.

FIG. 10 shows an example of a plurality of object detectors according to an embodiment of the present invention.

Referring to FIG. 10, the plurality of object detectors 201 may have an alignment pattern that covers the transmission pad 14.

The alignment pattern of the plurality of object detectors 201 may be determined by a shape of the transmission pad 14.

For example, the alignment pattern of the plurality of object detectors 201 in the case of the transmission pad 14 being in a rectangular shape may be different from the alignment pattern of the plurality of object detectors 201 in the case of the transmission pad 14 being in a hexagonal shape.

The plurality of object detectors 201 may include a first object detector 201a and a second object detector 201b.

Object detectors 201 each having the first coil part 210 stacked on the second coil part, and object detectors 201 each having the second coil part 212 stacked on the first coil part 210 may be aligned alternatively.

The first object detector 201a and the second object detector 201b may be disposed side by side.

For example, the first object detector 201a may be alternatively disposed with the second object detector 201b.

For example, the second object detector 201b may be alternatively disposed with the first object detector 201a.

For example, the first object detector 201a may be configured such that the first coil part 210a is stacked on the second coil part 212a. The second object detector 201b may be configured such that the second coil part 212b is stacked on the first coil part 210b.

Due to the above-described alignment pattern, a dead zone may be minimized and therefore an object detection rate may be increased.

Figure 11:
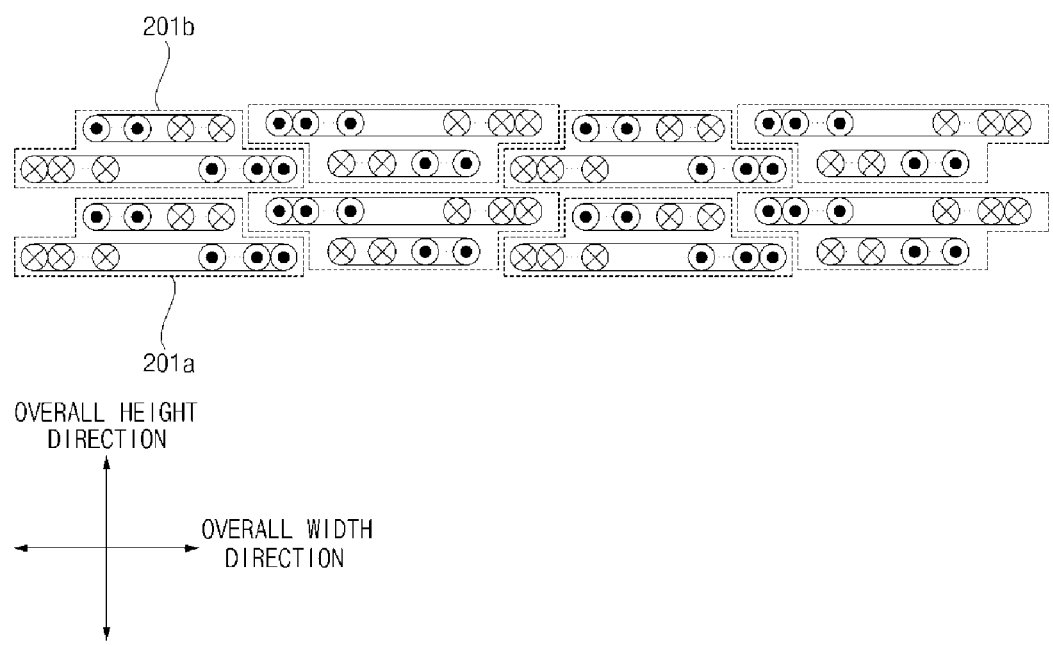
FIG. 11 shows an example of a plurality of object detector according to an embodiment of the present invention.

FIG. 11 shows an example of a plurality of object detector according to an embodiment of the present invention.

Referring to FIG. 11, the plurality of object detectors 201 may include a first object detector 201a and a second object detector 201b.

The first object detector 201a and the second object detector 201b may be stacked on each other.

As such, as the plurality of object detectors is stacked on each other, a dead zone may be minimized and therefore an object detection rate may be increased.

Meanwhile, the detection circuit 270 may control the first object detector 201a and the second object detector 201b to operate alternatively at a different time.

When the first object detector 201a and the second object detector 201b operates at the same time, the first object detector 201a and the second object detector 201b may be the cause of noise for each other.

If the first object detector 201a and the second object detector 201b operate alternatively at a different time, occurrence of noise may be minimized.

Figure 12A:
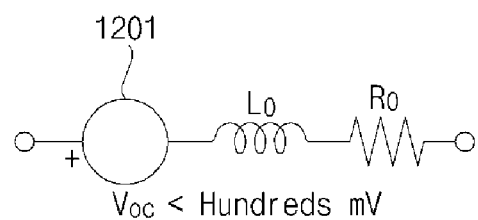
FIG. 12A to FIG. 12C are diagrams for explaining electrical connection of a plurality of object detectors according to an embodiment of the present invention.
Figure 12B:
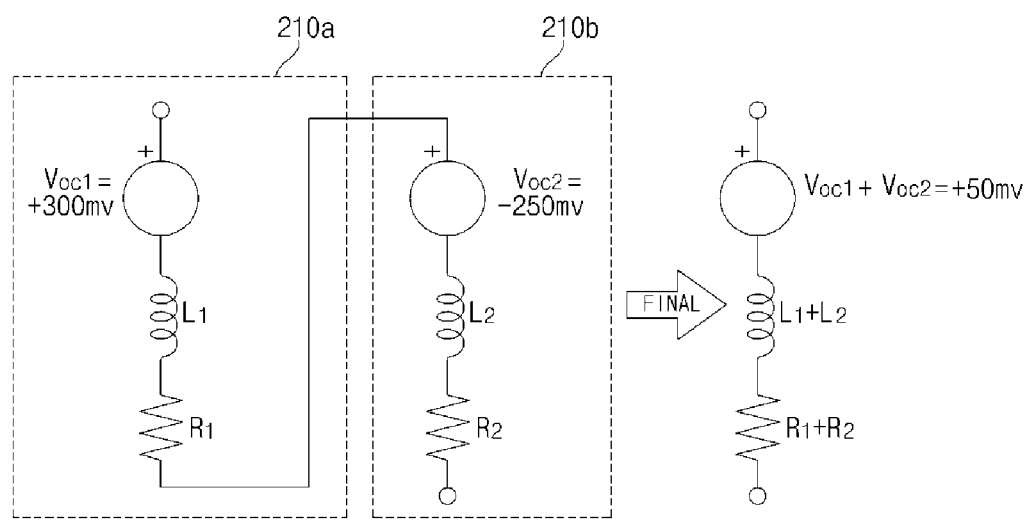
Figure 12C:
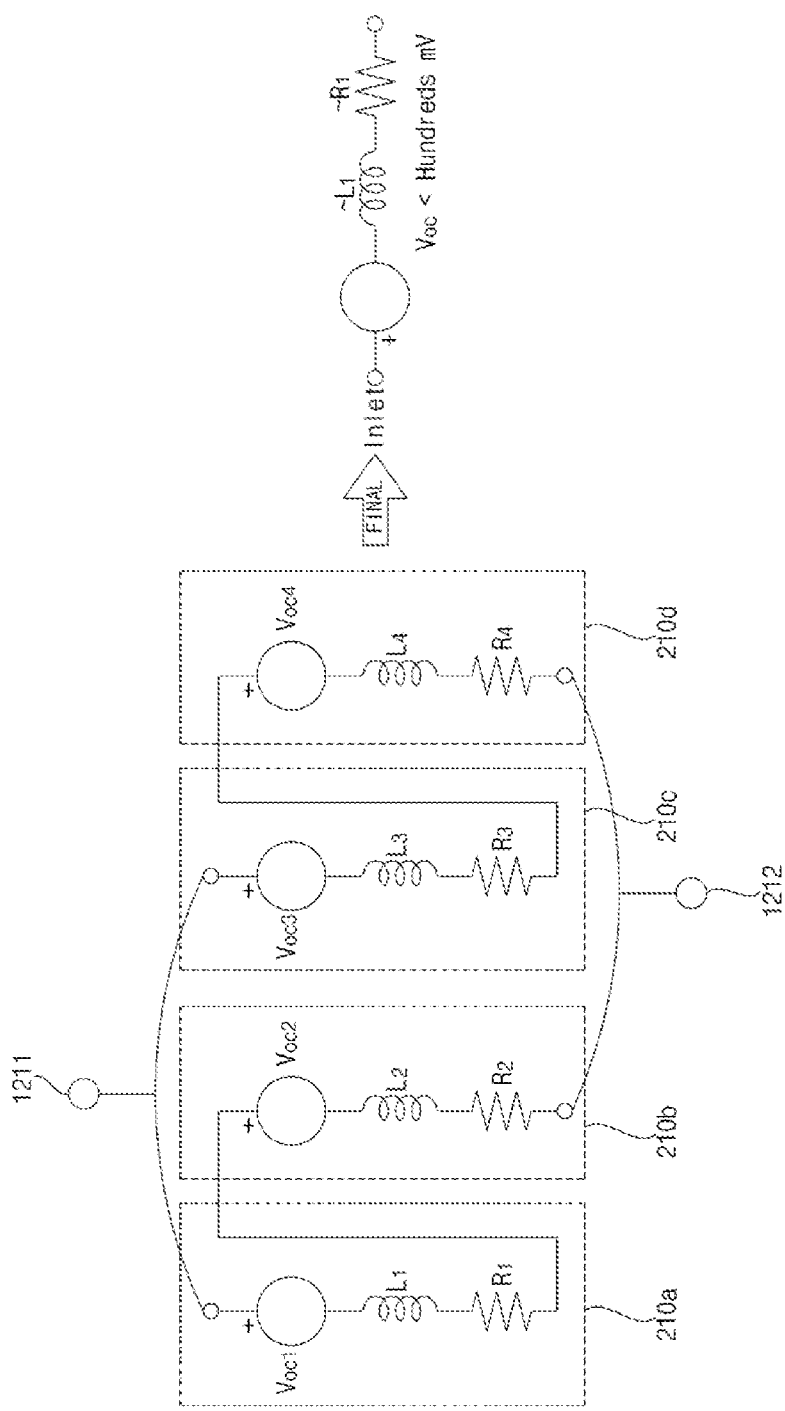

FIG. 12A to FIG. 12C are diagrams for explaining electrical connection of a plurality of object detectors according to an embodiment of the present invention.

FIG. 12A shows an example of an equivalent circuit of the first coil part 210 in the object detector shown in FIGS. 6 and 7.

Referring to FIG. 12A, an induced voltage of the first coil part may be canceled by the second coil part 212.

Even after the induced voltage of the first coil part 210 is canceled, a small amount of an induced voltage 1201 may remain.

As such, in the case where a small amount of the induced voltage 1201 remains, it does not affect detecting a relatively large-sized object (e.g., a can) but may reduce reliability of detection of a relatively small-sized object (e.g., a coin or a clip).

In particular, if a first layer and a second layer are made in the same size and an induced voltage is canceled by changing the number of turns for each layer for convenience of manufacturing, detection reliability may be reduced more.

Figure 13:
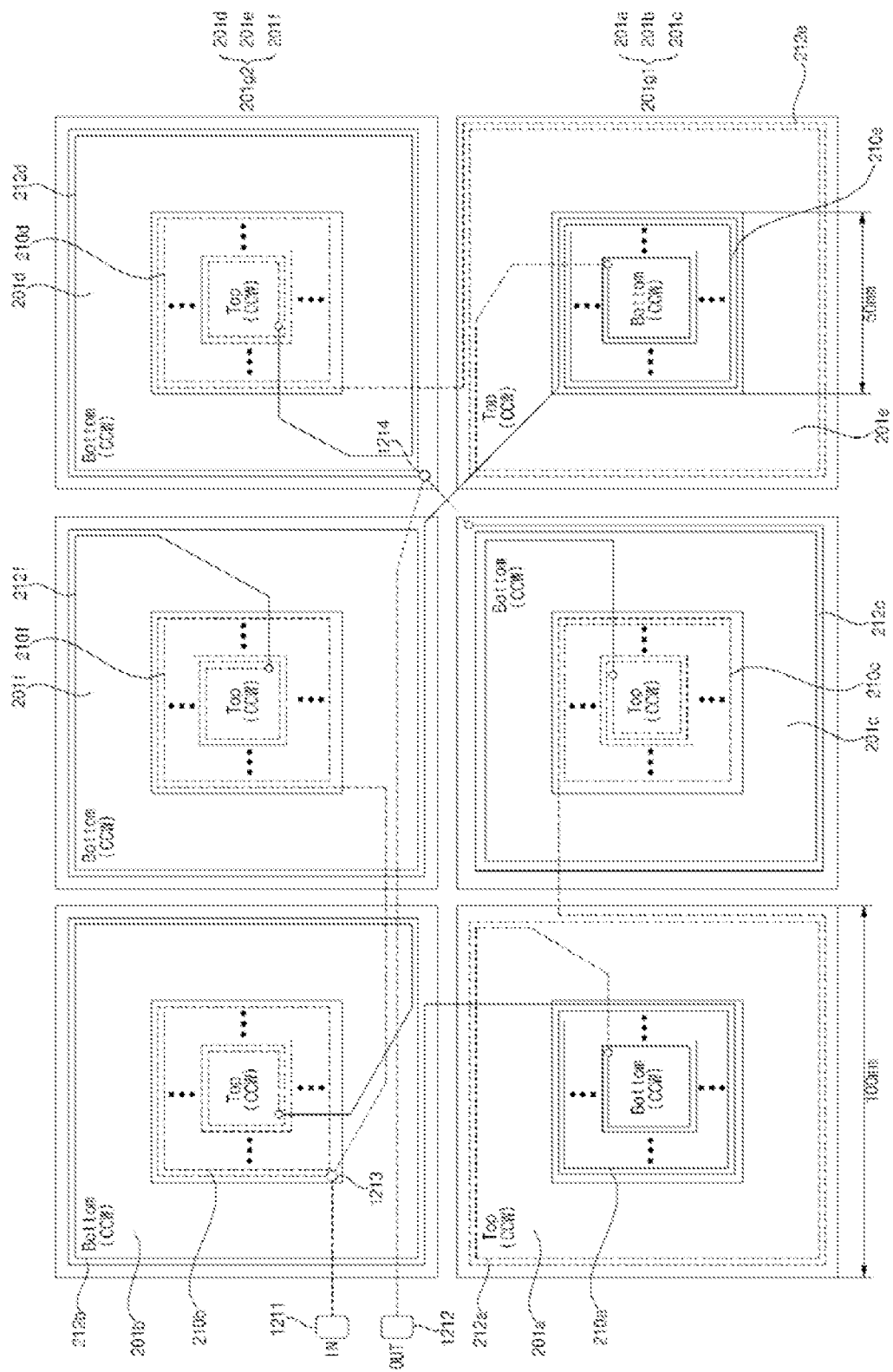

With reference to FIGS. 12 and 13, a plurality of object detectors which cancels a small amount of an induced voltage will be described.

FIG. 12B shows an example of an equivalent circuit in the case where two first coils 210a and 210b are connected in series.

Referring to FIG. 12B, a first coil part 210a of the first object detector 201a may be referred to as a first detection coil 210a.

A first coil part 210b of the second object detector 201b may be referred to as a second detection coil 210b.

The second detection coil 210b may have a residual induced voltage of the opposite phase (e.g., the opposite polarity of the first detection coil 210a.

Phase transition (e.g., polarity transition) may be implemented by turning a detection coil upside down.

As illustrated in FIG. 12B, the first detection coil 210a and the second detection coil 210b may be connected in series with each other.

When the first detection coil 210a and the second detection coil 210b are connected to each other as shown in FIG. 12B, a total residual induced voltage of the first and second detection coils 210a and 210b may be reduced than an individual induced voltage of the first detection coil 210a or the second detection coil 210b.

A total inductance value of the first and second detection coils 210a and 210b may be increased than an individual inductance value of the first detection coil 210a or the second detection coil 210b.

A total resistance value of the first and second detection coils 210a and 210b may be increased than an individual resistance value of the first detection coil 210a or the second detection coil 210b.

The increase in the inductance value and the resistance value will affect operational characteristics of an object detector and thus act as a cause of reducing object detection sensitivity of the foreign object detector.

FIG. 12C shows an example of an equivalent circuit of four first coil parts 210a, 210b, 210c, and 210d connected in series and in parallel with each other.

Referring to FIG. 12C, a first coil part 210a of the first object detector 201a may be referred to as a first detection coil 210a.

A first coil part 210b of the second object detector 201b may be referred to as a second detection coil 210b.

A first coil part 210c of the third object detector 201c may be referred to as a third detection coil 210c.

A first coil part 210d of the fourth object detector 201d may be referred to as a fourth detection coils 210d.

The first detection coil 210a and the second detection coil 210b may be connected in series with each other.

The third detection coil 210c and the fourth detection coil 210d may be connected to in series with each other.

The first detection coil 210a and the second detection coil 210b, which are connected in series with each other, may be connected in parallel with the third detection coil 210c and the fourth detection coil 210d which are connected in series with each other.

For example, the first detection coil 210a and the third detection coil 210c may be connected to a first port 1211. The first port 1211 may be an input port.

For example, the second detection coil 210b and the fourth detection coil 210d may be connected to a second port 1212. The second port 1212 may be an output port.

When the first, second, third, and fourth detection coils 210a, 210b, 210c, and 210d are connected to each other as shown in FIG. 12C, a total residual induced voltage of the first, second, third, and fourth detection coils 210a, 210b, 210c, and 210d may be reduced than an individual induced voltage of the first, second, third, or fourth detection coil 210a, 210b, 210c, or 210d.

A total inductance value of the first, second, third and fourth detection coils 210a, 210b, 210c, and 210d may be similar to an individual inductance value of the first, second, third, or fourth detection coil 210a, 210b, 210c, or 210d.

A total resistance value of the first, second, third, and fourth detection coils 210a, 210b, 210c, and 210d may be similar to an individual resistance value of the first, second, third, or fourth detection coil 210a, 210b, 210c, or 210d.

Based on the connected structure as shown in FIG. 12, it is possible to detect a relatively small-sized object even without greatly changing an operation point of the plurality of object detectors.

FIG. 13 is a diagram for explaining electrical connection of a plurality of object detectors according to an embodiment of the present invention.

FIG. 13 shows an example in which six object detectors are provided, but there is no limitation in the number of object detectors.

In some implementations, the number of the plurality of object detectors 201 may be less than 6.

In some implementations, the number of the plurality of object detectors 201 may be more than 6.

The plurality of object detectors 201 may include first group object detectors 201g1 and second group object detectors 201g2.

The first group object detectors 201g1 are connected in parallel with the second group object detectors 201g2.

In the first group object detectors 201g1, adjacent object detectors are connected in series with each other.

For example, the first group object detectors 201g1 may include the first object detector 201a, the second object detector 201b, and the third object detector 201c.

The second object detector 201 may be disposed adjacent to the first object detector 201a in a first direction.

The third object detector 201c may be disposed adjacent to the first object detector 201 in a second direction different from the first direction.

For example, the second direction may be a direction that forms 90 degrees relative to the first direction.

The first group object detectors 201g1 may be disposed to be engaged with the second group object detectors 201g2.

The first group object detectors 201g1 may be aligned such that the second object detector 201b and the third object detector 201c are aligned in the shape of "⌞" with reference to the first object detector 201a.

For example, each of the first to third object detectors 201a, 201b, and 201c may have a rectangular shape of a similar size.

For example, the second object detector 201b may be disposed upper than the first object detector 201a.

For example, the third object detector 201c may be disposed on the right side of the first object detector 201a.

Due to the above-described alignment, the first group object detectors 201g1 may have the shape of "⌞".

The second group object detector 201g2 is connected in parallel with the first group object detectors 201g1.

In the second group object detectors 201g2, adjacent object detectors are connected to in series with each other.

For example, the second group object detectors 201g2 may include the fourth object detector 201d, the fifth object detector 201e, and the sixth object detector 201f.

The fifth object detector 201e may be disposed adjacent to the fourth object detector 201d in a direction opposite to the first direction.

The direction opposite to the first direction may be understood as a direction that forms 180 degrees relative to the first direction.

The sixth object detector 201f may be disposed adjacent to the fourth object detector 201d in a direction opposite to the second direction.

The direction opposite to the second direction may be understood as a direction that forms 180 degrees relative to the second direction.

For example, the direction opposite to the first direction may be a direction that forms 90 degrees relative to the direction opposite to the second direction.

The second group object detectors 201g2 may be disposed to be engaged with the first group object detectors 201g1.

The second group object detectors 201g2 may be aligned such that the fifth object detector 201e and the sixth object detector 201f are aligned in the shape of "⌝" with reference to the fourth object detector 201d.

For example, each of the fourth to sixth object detectors 201d, 201e, and 201f may have a rectangular shape in a similar size.

For example, the fifth object detector 201e may be disposed lower than the fourth object detector 201d.

For example, the sixth object detector 201f may be disposed on the left side of the fourth object detector 201d.

Due to the above-described alignment, the second group object detectors 201g2 may have the shape of "⌝".

Meanwhile, as the first coil part 210 and the second coil part 121 are stacked on each other, the plurality of object detectors 201 may include a first layer and a second layer.

The first layer may be composed of a combination of at least some from among a plurality of first coil parts 210 and a plurality of second coil parts 212.

For example, the first layer may be formed of: a first coil part 210a of the first object detector 201; a second coil part 212b of the second object detector 201b; a second coil part 212c of the third object detector 201c; a second coil part 212d of the fourth object detector 201d; a first coil part 210e of the fifth object detector 201e; and a second coil part 212f of the sixth object detector 201f.

The second layer may be composed of a combination of coils parts which are not used to form the first layer from among the plurality of first coil parts 210 and the plurality of second coil parts 212.

For example, the second layer may be formed of: a second coil part 212a of the first object detector 201a; a first coil part 210b of the second object detector 201b; a first coil part 210c of the third object detector 201c; a first coil part 210d of the fourth object detector 201d; a second coil part 212e of the fifth object detector 201e; and a first coil part 210f of the sixth object detector 201f.

The second layer may be disposed above the first layer.

The foreign object detector 200 may include a first port 1211 and a second port 1212.

The first port 1211 may be an input port.

The first port 1211 may be electrically connected to the plurality of object detectors 201.

The second port 1211 may be an output port.

The second port 1212 may be electrically connected to the plurality of object detectors 201.

The first port 1211 and the second port 1211 may be connected to the outside of the boundary of the transmission pad 14.

As the first port 1211 and the second port 1212 are connected to the outer side of the boundary of the transmission pad 14, it is possible to reduce a thickness of the whole system and cover most of the region of the transmission pad 14 with a combination of a plurality of foreign object detectors.

The number of turns in a first coil part of at least one object detector in the plurality of object detectors 201 may be different from the number of turns in a first coil part of at least one of remaining object detectors.

The number of turns in a second coil of at least one object detector in the plurality of object detectors 201 is different from the number of turns in a second coil of at least one of remaining object detectors.

The transmission pad 14 may have a different characteristic (e.g., a magnetic characteristic or an electrical characteristic) in each region depending on a winding direction, a winding shape, and a relationship with the reception pad 21.

The first coil art 210 and the second coil part 212 may have the number of turns that fits a characteristic of each region of the transmission pad 14.

The number of turns in each region of the first coil 210 and the second coil 212 may be determined through an experiment.

A stacked order of a first coil part and a second coil part of at least one object detector in the plurality of object detectors 201 may be different from a stacked order of a first coil part and as second coil part of at least one of remaining object detectors.

For example, unlike the second, third, fourth, and sixth object detectors 201b, 201c, 201d, and 201f, the first object detector 201a may be configured such that the second coil part 212a is stacked on the first coil part 210a.

For example, unlike the second, third, fourth, and sixth object detector 201b, 201c, 201d, and 201f, the fifth object detector 201e may be configured such that the second coil part 212e is stacked on the first coil part 210e.

The second, third, fourth, and sixth object detectors 201b, 201c, 201d, and 201f may be configured such that the first coil parts 210b, 210c, 210d, and 210f are stacked on the second coil parts 212b, 212c, 212d, and 212f, respectively.

An induced voltage of at least one object detector in the plurality of object detectors 201 may have a polarity opposite to a polarity of an induced voltage of at least one of remaining object detectors.

For example, an induced voltage of the first object detector 201a may have a polarity opposite to a polarity of an induced voltage of each of the second, third, fourth and sixth object detectors 201b, 201c, 201d, and 201f.

For example, an induced voltage of the fifth object detector 201e may have a polarity opposite to a polarity of an induced voltage of each of the second, third, fourth, and sixth object detectors 201b, 201c, 201d, and 201f.

As such, as object detectors having an opposite induced voltage is provided in the plurality of object detection apparatuses 201, it is possible to reduce a total induced voltage while maintaining a total inductance value and a total resistance value.

Hereinafter, electrical connection between the first port 1211, the second port, 1212, and the plurality of object detectors 201 will be described. In the following description, connection refers to electrical connection.

The first port 1211 is connected to the first group object detectors 201g1 and the second group object detectors 201g2.

The second port 1212 is connected to the first group object detectors 201g1 and the second group object detectors 201g2.

Due to the above-described connection, the first group object detector 201g1 and the second group object detector 201g2 may be understood as being connected in parallel with each other, as viewed from the first port 1211 and the second port 1212.

As shown in FIG. 13, the first port 1211 may be connected to a first node 1213.

The first node 1213 may be a node to which the first coil part 210b of the second object detector 201b and the first coil part 210f of the sixth object detector 201f are connected.

The first node 1213 may be connected to the first coil part 210b of the second object detector 201b. The first coil part 210b of the second object detector 201b may be connected to the second coil part 212b of the second object detector 201b. The second coil part 212b of the second object detector 201b may be connected to the first coil part 210a of the first object detector 201a. The first coil part 210a of the first object detector 201a may be connected to the second coil part 212a of the first object detector 201a. The second coil part 212a of the first object detector 201 may be connected to the first coil part 210c of the third object detector 201c. The first coil part 210c of the third object detector 201c may be connected to the second coil part 212c of the third object detector 201c. The second coil part 212c of the third object detector 201c may be connected to the second node 1214. The first node 1213 may be connected to the first coil part 210f of the sixth object detector 201f. The first coil part 210f of the sixth object detector 201f may be connected to the second coil part 212f of the sixth object detector 201f. The second coil part 212f of the sixth object detector 201f may be connected to the first coil part 210e of the fifth object detector 201e. The first coil part 210e of the fifth object detector 201e may be connected to the second coil part 212e of the fifth object detector 201e. The second coil part 212e of the fifth object detector 201e may be connected to the first coil part 210d of the fourth object detector 201d. The first coil part 210d of the fourth object detector 201d may be connected to the second coil part 212d of the fourth object detector 201d. The second coil part 212d of the fourth object detector 201d may be connected to the second node 1214.

The second node 1214 may be connected to the second port 1211.

The second node 1214 may be a node to which the second coil part 212c of the third object detector 201c and the second coil part 212d of the fourth object detector 201d.

Figure 14:
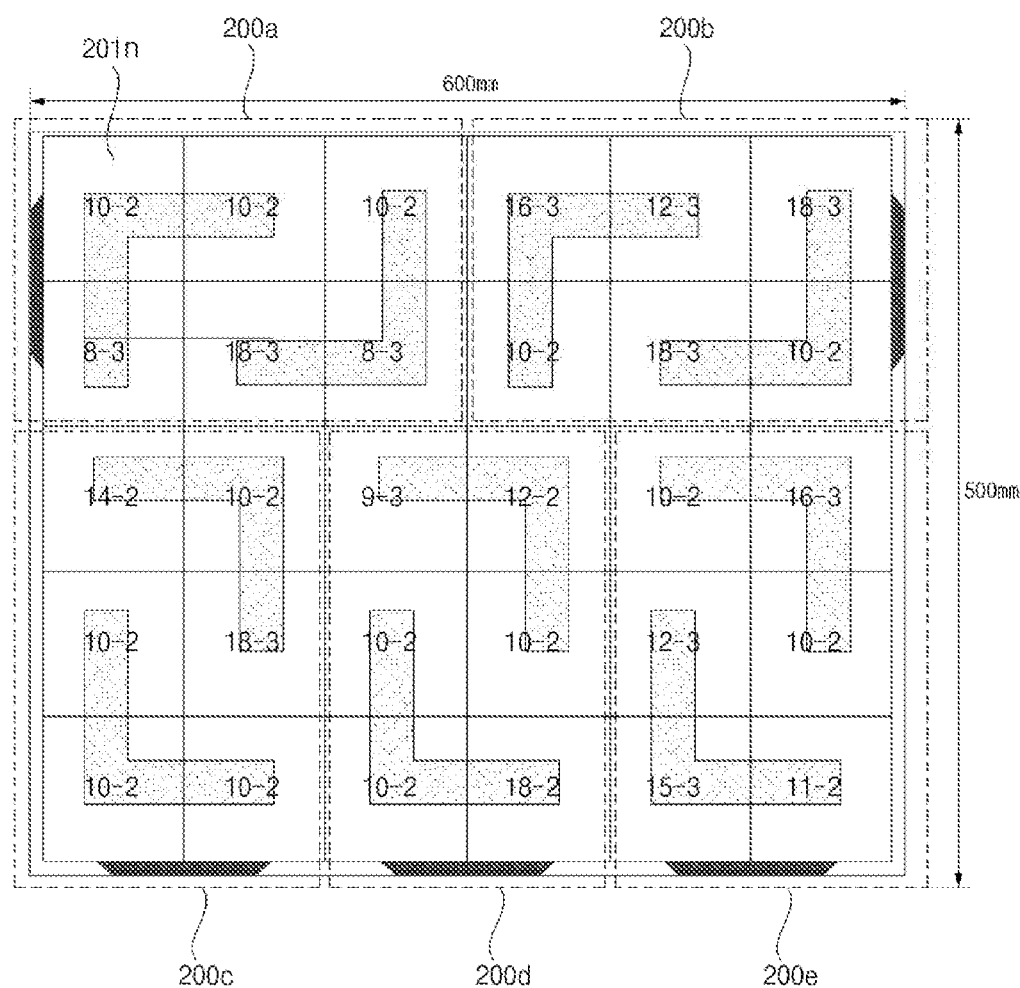
FIG. 14 is a diagram for explaining a wireless charging apparatus according to an embodiment of the present invention.

FIG. 14 is a diagram for explaining a wireless charging apparatus according to an embodiment of the present invention.

Referring to FIG. 14, a wireless charging apparatus 99 may be understood as a kind of the above-described power transmitting apparatus 10.

The wireless charging apparatus 99 may include an AC/DC converter 11, a DC/AC/inverter 12, a resonant tank 13, and a transmission pad 14.

The transmission pad 14 may wirelessly transmit power.

The wireless charging apparatus 99 may further include a plurality of foreign object detectors 200 provided in the transmission pad 14.

FIG. 14 shows an example in which the wireless charging apparatus 99 includes five foreign object detectors 200a, 200b, 200c, 200d, and 200e, but there is no limitation to the number of foreign object detectors.

Description about the foreign object detectors 200 described above with reference to FIGS. 4 to 13 may be applied to each of the plurality of foreign object detectors.

Each of the plurality of foreign object detectors may include a plurality of object detectors 201 and a detection circuit 270.

The plurality of object detectors 201 may be provided between the transmission pad 14 and a reception pad 21 of a wireless charging system 100.

The detection circuit 270 may determine whether an object exists, based on data received from the plurality of object detectors 201.

Each of the plurality of object detectors 201 may include: a first coil part 210 in which a coil is wound in a first direction; and a second coil part 212 which is stacked on the first coil part 210 and in which a coil is wound in a second direction different from the first direction.

Each of the plurality of object detectors 201 may be connected in series or in parallel with each other.

Meanwhile, numeric values in each of the plurality of foreign object detectors in FIG. 14 indicate the number of windings of the first coil part 210, and the number of windings of the second coil part 212.

For example, in FIG. 14, the number of windings of the first coil part 210*a* of the first foreign object detector 201*a* may be understood to be 10, and the number of windings of the second coil part 212*a* of the first foreign object detector 201 may be understood to be 2.

Figure 15:
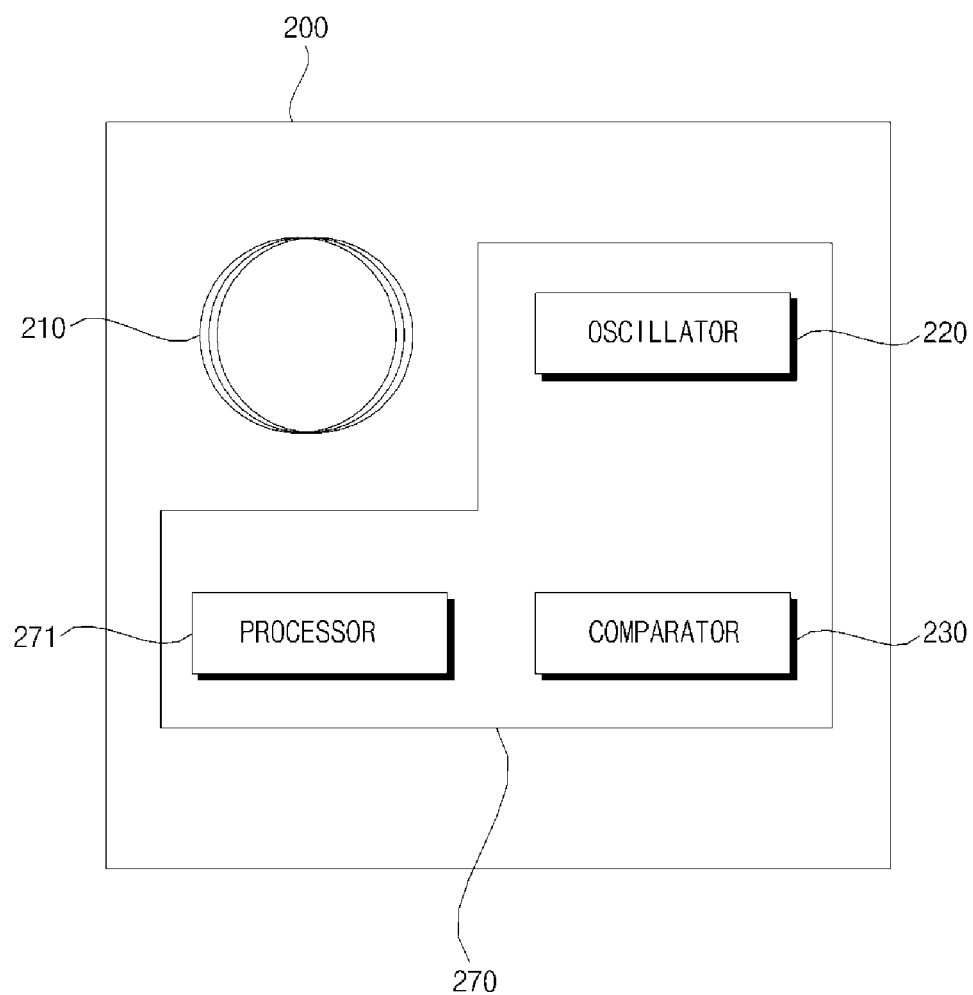
FIG. 15 is a diagram for explaining a foreign object detector according to an embodiment of the present invention.

FIG. 15 is a diagram for explaining a foreign object detector according to an embodiment of the present invention.

Referring to FIG. 15, the detection circuit 270 may be electrically connected to the first coil part 210.

As described above, the first coil parts 210 includes a plurality of first coil parts.

The detection circuit 270 may include a oscillator 220, a comparator 230, and a processor 271.

the oscillator 220, the comparator 230, and the processor 271 may be electrically connected to each other.

The foreign object detectors 200 may further include a power supply unit.

The first coil part 210 may have a predetermined impedance. In the case where a metal foreign object is located around the first coil part 210, a change occurs in impedance of the coil 210 from an outside perspective.

The oscillator 220 may generate an AC signal.

For example, the oscillator 220 may be configured as a oscillating circuit that includes a Bipolar Junction Transistor (BJT) or an Operational Amplifier (OP Amp).

For example, the oscillator 220 may be a Colpitts oscillator.

The comparator 230 may compare a first element, which defines a reference signal of the oscillator 220, and a second element, which defines an actual output signal from the oscillator 220.

The reference signal may be defined as an output signal from the oscillator 220 in a state in which there is no change in circuit configuration, such as the first coil part 210.

For example, the reference signal may be a signal that is output based on a unique impedance of a circuit including the first coil part 210 because no metal foreign object is located around the first coil part 210.

If a metal foreign object located around the first coil part 210, impedance of the first coil part 210 changes.

In this case, there may be difference between the reference signal and the actual output signal.

For example, in the case where a metal foreign object is located around the first coil part 210, it appears from a perspective of a power terminal that impedance of the first coil 210 changes, and therefore, there will be difference between a peak value of the reference signal and a peak value of the actual output signal.

For example, in the case where a metal foreign object is located around the first coil part 210, it appears from a perspective of a power terminal that impedance of the first coil part 210 changes, and therefore, there will be difference between a frequency of the reference signal and a frequency of the actual signal.

The difference between the reference signal and the output signal will be described in more detail with reference to FIGS. 18 to 19.

The comparator 230 may generate a first signal when there is difference between the first element and the second element.

For example, when there is difference between the first element and the second element, the comparator 230 may generate a high signal which is a DC signal. In some implementations, the comparator 230 may generate a low signal, which is a DC signal, when there is difference between the first element and the second element.

The comparator 230 may generate a second signal when there is no difference between the first element and the second element.

For example, the comparator 230 may generate a low signal, which is a DC signal, when there is no difference between the first element and the second element. In some implementations, the comparator 230 may generate a high signal, which is a DC signal, when there is no difference between the first element and the second element.

In some implementations, the foreign object detectors 200 may further include a peak detector.

The peak detector may detect a peak value of an output signal.

The comparator 230 may generate a first signal and a second signal by comparing a peak value of the reference signal and a peak value of the output signal.

For example, when there is difference between the peak value of the reference signal and the peak value of the output signal, the comparator 230 may generate a first signal.

For example, when there is no difference between the peak value of the reference signal and the peak value of the output signal, the comparator 230 may generate a second signal.

In some implementations, the foreign object detectors 200 may further include a frequency detector.

The frequency detector may detect a frequency of an output signal.

The comparator 230 may generate a first signal and a second signal by comparing a frequency of the reference signal and a frequency of the output signal.

For example, when there is difference between the frequency of the reference signal and the frequency of the output signal, the comparator 230 may generate the first signal.

For example, the comparator 230 may generate the second signal when there is no difference between the frequency of the reference signal and the frequency of the output signal.

The processor 271 may be electrically connected to each constituent element of the foreign object detectors 200.

The processor 271 may control each constituent element of the foreign object detectors 200.

Based on the first signal and the second signal, the processor 271 may determine whether a foreign object is located between the transmission pad 14 and the reception pad 21.

When it is determined that a foreign object exists between the transmission pad 14 and the reception pad 21, the processor 271 may generate a signal for outputting an alarm.

In some implementations, the foreign object detectors 200 may further include an additional alarming unit.

The processor 271 may perform control so that an alarm is output from the alarming unit.

The processor 271 may provide a control signal to a user interface apparatus so that an alarm is output through the user interface apparatus.

The processor 271 may provide, to the wireless charging system 100, a signal for stopping wireless charging.

In some implementations, the processor 270 may function as the comparator 230.

Specifically, the processor 271 may compare a first element, which defines a reference signal of the oscillator 220, and a second element, which defines an actual output signal from the oscillator 220.

When it is determined that there is difference between the first element and the second element, the processor 271 may determine that a foreign object exists between the transmission pad 14 and the reception pad 21.

When it is determined that there is no difference between the first element and the second element, the processor 271 may determine that no foreign object exists between the transmission pad 14 and the reception pad 21.

The foreign object detector 200 may further include a memory.

The memory may store the first element that defines the reference signal.

Figure 16:
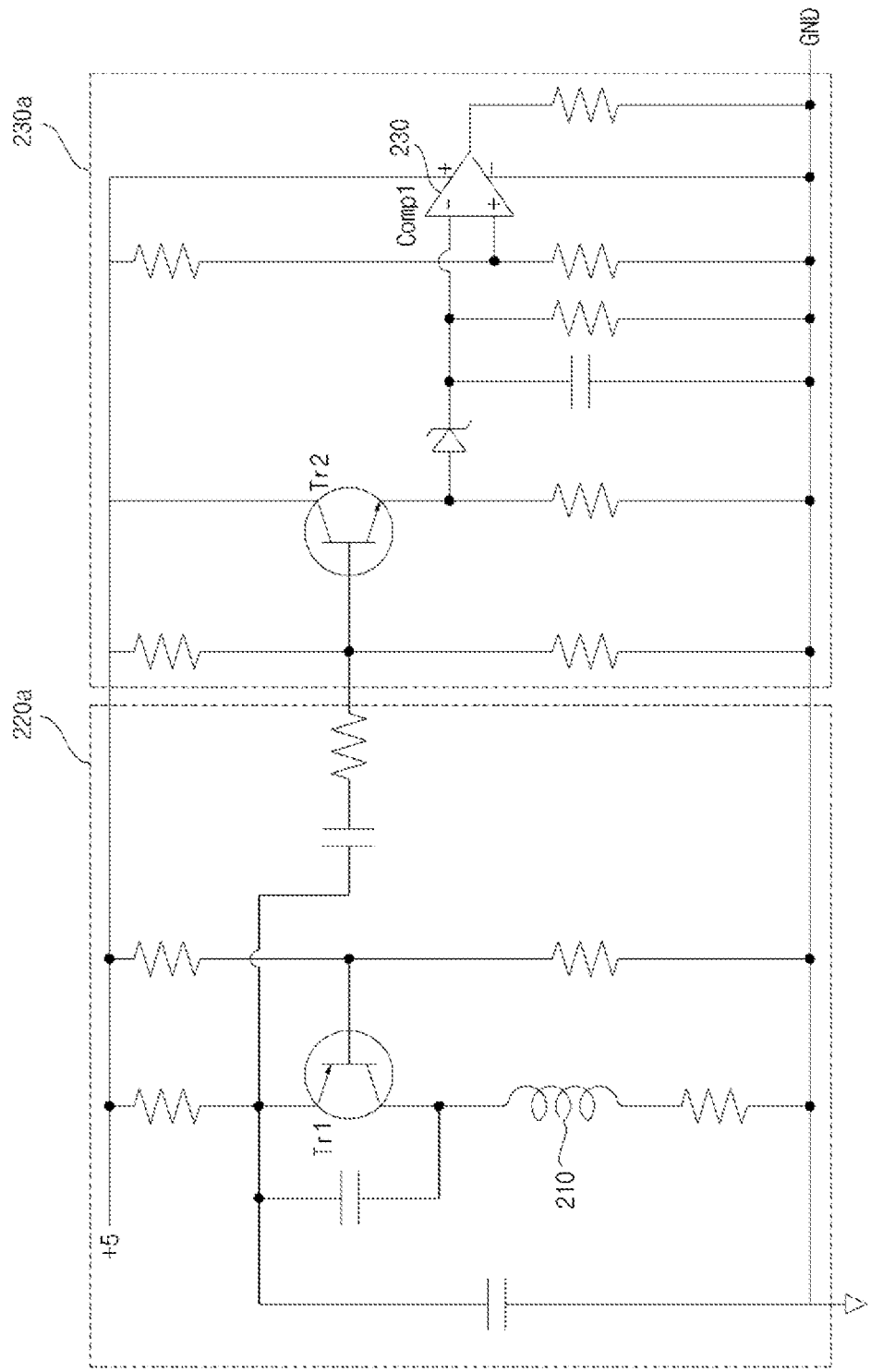
FIG. 16 is a diagram for explaining circuit configuration of an oscillator circuit and a comparison circuit according to an embodiment of the present invention.

FIG. 16 is a diagram for explaining circuit configuration of an oscillator circuit and a comparison circuit according to an embodiment of the present invention.

Referring to FIG. 16, a Colpitts oscillator 220a may be used as the oscillator 220.

In some implementations, the oscillator 220 may be configured as an oscillating circuit that including a BJT or an OP Amp.

If a metal foreign object approaches the first coil part 210, equivalent impedance of the first coil part 210 changes.

A second transistor Tr2 included in the comparison circuit 230a amplifies the magnitude of an oscillating signal of a first transistor Tr1 included in the oscillator 220.

The comparator 230 may generate a first signal or a second signal by comparing an output voltage of an emitter terminal of the second transistor Tr2 and a reference voltage of a positive input terminal (+) of the comparator 230.

Figure 17:
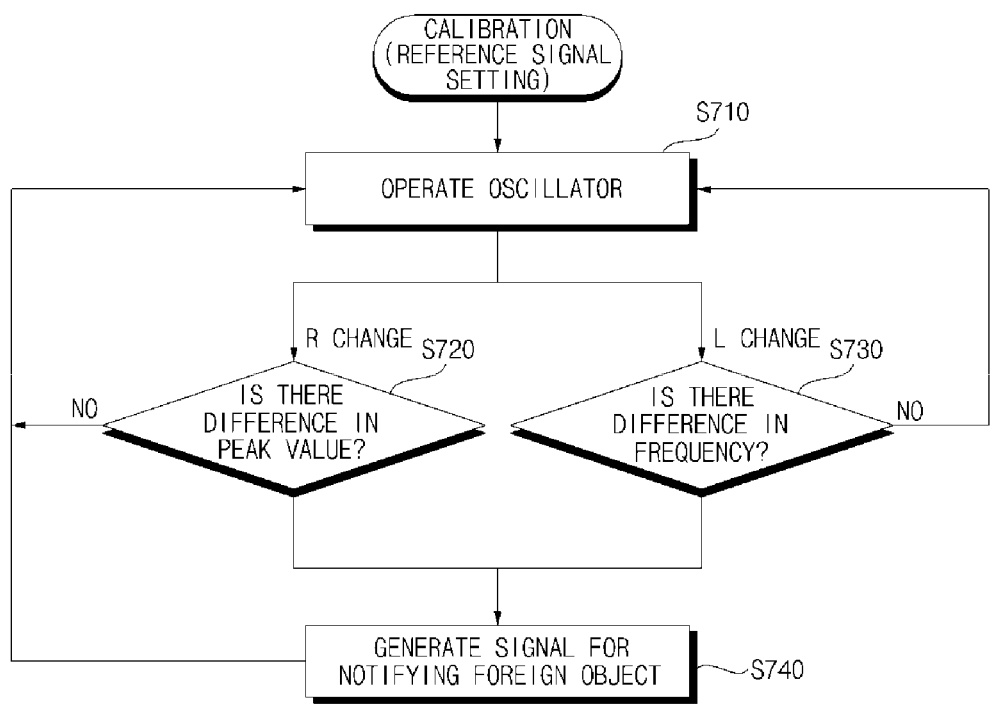
FIG. 17 is a flowchart illustrating operation of a foreign object detector according to an embodiment of the present invention.

FIG. 17 is a flowchart illustrating operation of a foreign object detector according to an embodiment of the present invention.

Referring to FIG. 17, the processor 271 may perform calibration on a reference signal.

The processor 271 may perform control so that the oscillator 220 operates in S710.

The comparator 230 may compare a first element, which defines a reference signal of the oscillator 220, and a second element, which defines an output signal from the oscillator 220.

For example, the foreign object detectors 200 may further include a peak detector. In this case, the comparator 230 may compare a peak value of the reference signal of the oscillator 220 and a peak value of an output signal detected by the peak detector in S720.

If there is change in resistance of the impedance of the first coil part 210, a peak value of the output signal may change.

For example, the foreign object detectors 200 may further include a frequency detector. In this case, the comparator 230 may compare a frequency of the reference signal of the oscillator 220 and a frequency of an output signal detected by the frequency detector in S730.

If there is change in an inductance of the impedance of the first coil part 210, a frequency of the output signal may change.

In the operation S720, when it is determined that there is difference between the peak value of the reference signal and the peak value of the output signal, the processor 271 may generate a signal for outputting an alarm in S740.

In the operation S730, if it is determined that there is difference between the frequency of the reference signal and the frequency of the output signal, the processor 271 may generate a signal for outputting an alarm in S740.

Figure 18:
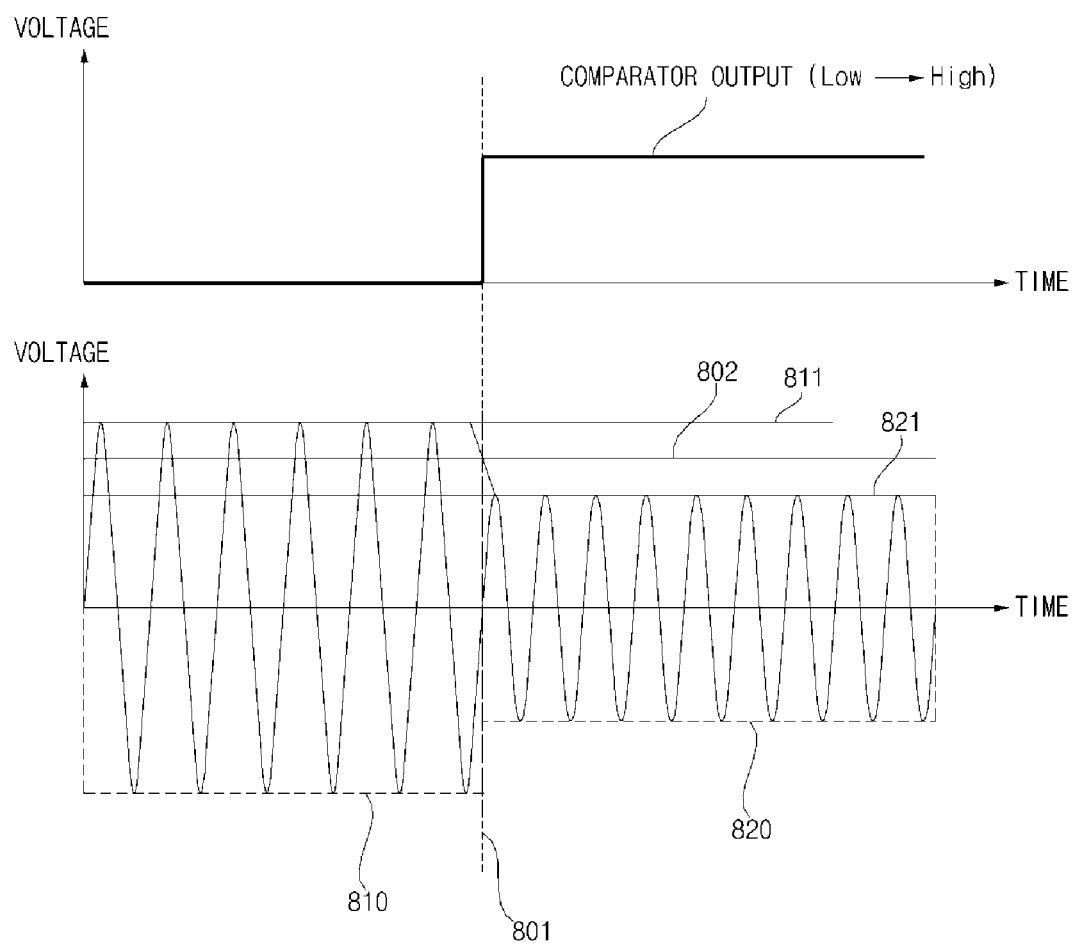
FIGS. 18 and 19 are diagrams for explaining a reference signal and an output signal according to an embodiment of the present invention.
Figure 19:
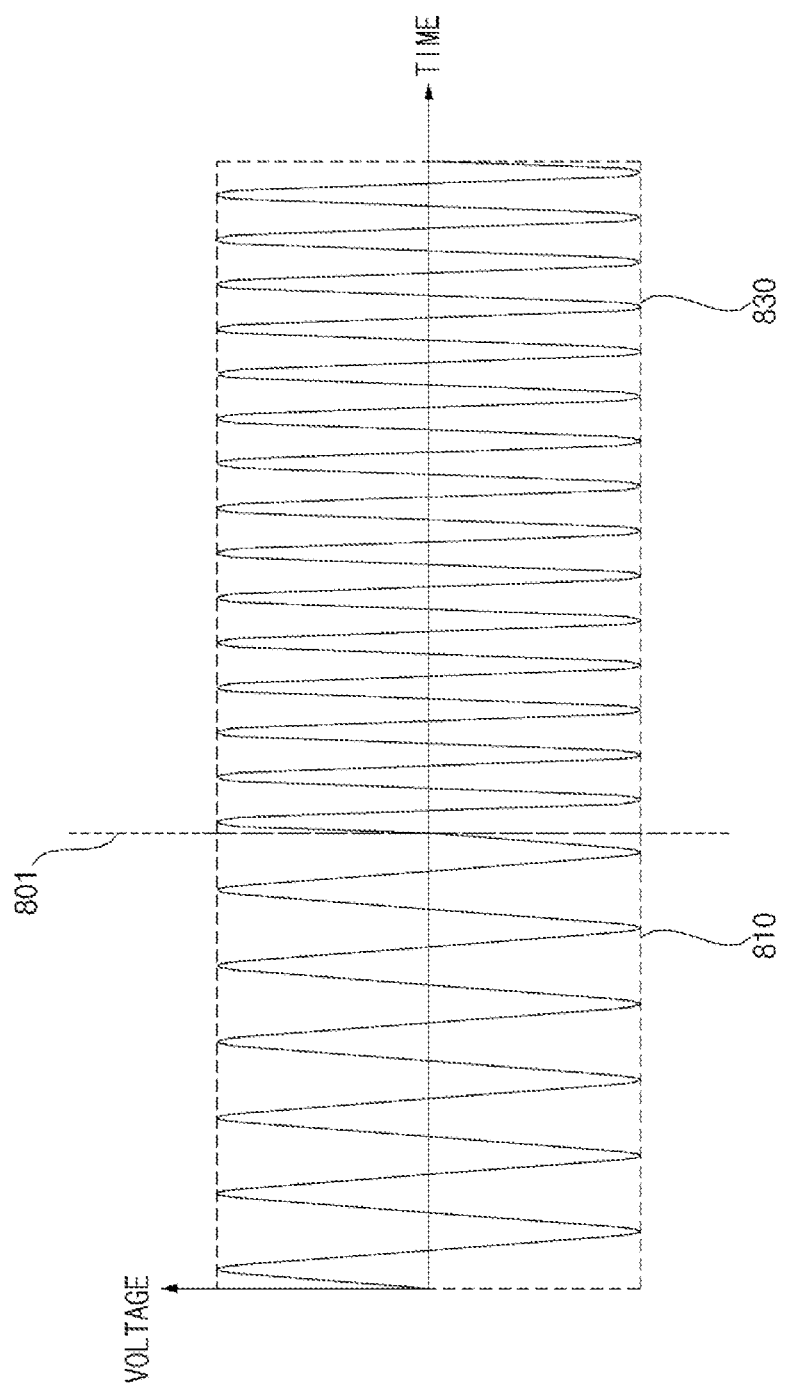

FIGS. 18 and 19 are diagrams for explaining a reference signal and an output signal according to an embodiment of the present invention.

The comparator 230 may compare a first element, which defines a reference signal of the oscillator 220, and a second element, which defines an actual output signal from the oscillator 220.

If a metal foreign object exists around the first coil part 210, it appears from a perspective of the oscillator 220 that equivalent impedance of the first coil part 210 changes due to the metal foreign object.

Referring to FIG. 18, the magnitude of the output signal from the oscillator 220 is determined by equivalent resistance of the first coil part 210.

If resistance in equivalent impedance of the first coil part 210 changes, the magnitude of the output signal from the oscillator 220 changes.

Reference numeral 810 indicates an output signal that is output when no foreign object exists around the first coil part 210. Reference Numeral 810 may be understood as the reference signal.

Reference numeral 820 indicates an output signal that is output when a metal foreign object exists around the first coil part 210.

In a situation in which there no metal foreign object exists around the coil part 210, if a metal foreign substance is placed adjacent at a time 801, an output signal may be formed as indicated by reference numerals 810 and 820 in FIG. 18.

The comparator 230 may generate a first signal and a second signal by comparing a peak value 811 of a reference signal 810 and a peak value 821 of an output signal 820.

When there is difference between the peak value 811 of the reference signal 810 and the peak value 821 of the output signal 820, the comparator 230 may generate a high signal as the first signal.

When there is no difference between the peak value 811 of the reference signal 810 and the peak value 821 of the output signal 820, the comparator 230 may generate a low signal as the second signal.

Meanwhile, the comparator 230 may generate the first signal and the second signal by comparing a reference value 802, which is set to be smaller by a specific value than the peak value 811 of the reference signal 810, and the peak value 821 of the output signal 820.

Referring to FIG. 19, a frequency of an output signal from the oscillator 220 may be determined by equivalent inductance of the first coil part 210 and a value of a capacitor included in the oscillator 220.

If an inductance of equivalent impedance of the first coil part 210 changes, a frequency of the output signal from the oscillator 220 changes.

Reference numeral 820 indicates an output signal that is output when no metal foreign substance exists around the first coil part 210. Reference numeral 810 may be understood as a reference signal.

Reference numeral 820 indicates an output signal that is output when a metal foreign object exists around the first coil part 210.

In a situation in which no metal foreign object exists around the first coil part 210, if a metal foreign object is placed adjacent at a time 801, an output signal may be formed as indicated by reference numerals 810 and 830 in FIG. 18.

The comparator 230 may generate a first signal and a second signal by comparing a frequency of a reference signal 810 and a frequency of an output signal 830.

When there is difference between the frequency of the reference signal 810 and the frequency of the output signal 820, the comparator 230 may generate a high signal as the first signal.

When there is no difference between the frequency of the reference signal 810 and the frequency of the output signal 820, the comparator 230 may generate a low signal as the second signal.

Figure 20:
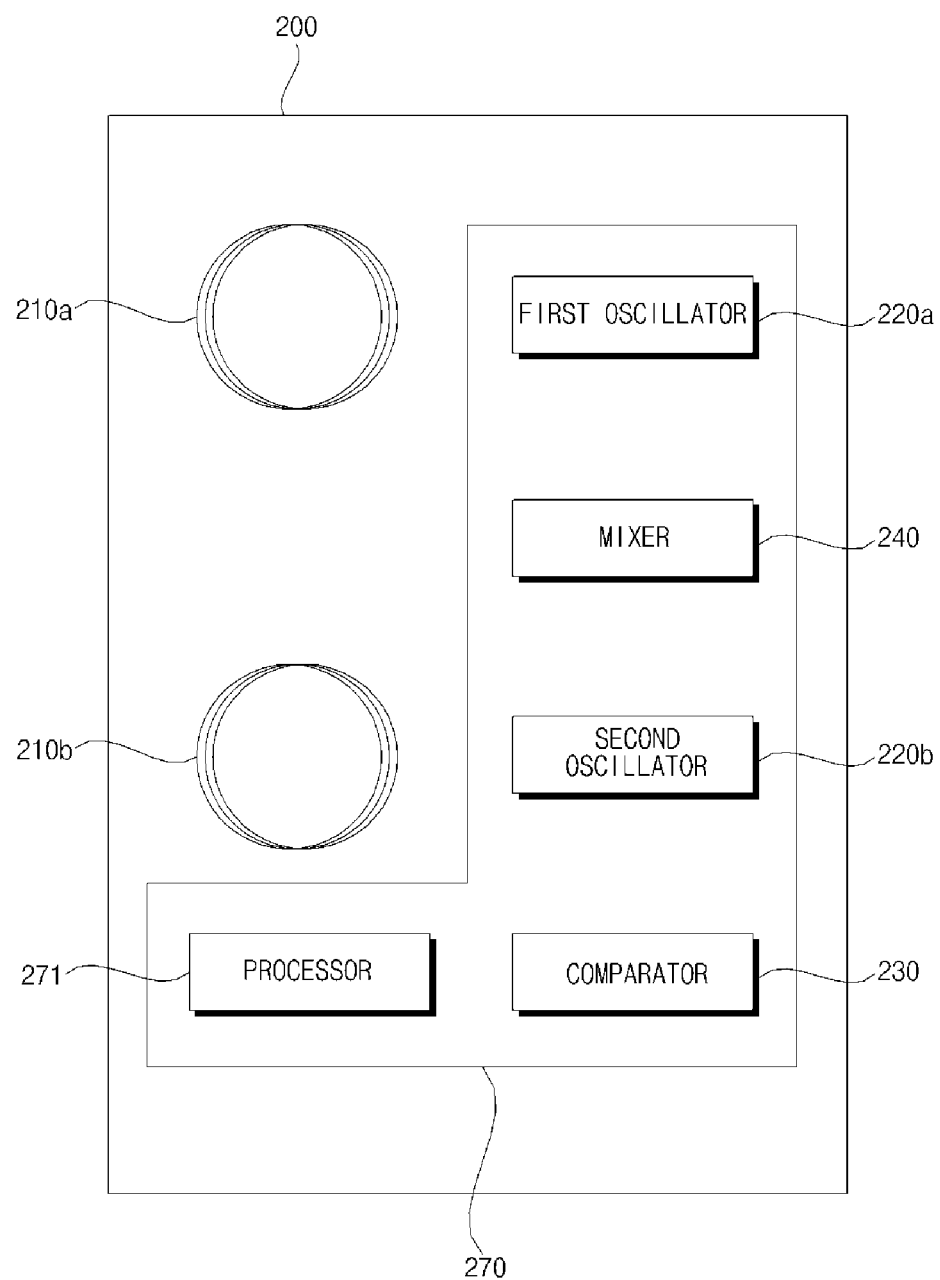
FIG. 20 is a diagram for explaining a foreign object detector according to an embodiment of the present invention.

FIG. 20 is a diagram for explaining a foreign object detector according to an embodiment of the present invention.

Referring to FIG. 20, the detection circuit 270 may be connected to a plurality of first coil parts 210a and 210b.

Description about the first coil part 210 described above with reference to FIGS. 1 to 19 may be applied to the plurality of coil parts 210a and 210b shown in FIG. 20.

Description about the oscillator 220 described above with reference to FIGS. 1 to 19 may be applied to a first oscillator 220a and a second oscillator 220b shown in FIG. 20.

Hereinafter, what is different from the description provided with reference to FIGS. 1 to 19 will be mainly described.

The first oscillator 220a may generate a first AC signal.

The second oscillator 220b may generate a first AC signal.

The first oscillator 220a and the second oscillator 220b may generate AC signals that is defined as the same element.

One 210a of the plurality of first coil parts may be electrically connected to the first oscillator 220a.

The other one 210b of the plurality of the first coil parts may be electrically connected to the second oscillator 220b.

The comparator 230 may compare a first element, which defines a first output signal from the first oscillator 220a, and a second element, which defines a second output signal from the second oscillator 220b.

If a foreign substance exists around one 210a of the plurality of coil parts, there will be difference between the first output signal and the second output signal due to change in impedance in one 210a of the plurality of first coil parts. Based on the change, the existence of the foreign substance may be determined.

The comparator 230 may generate a comparison signal based on a comparison result.

The processor 271 may determine, based on the comparison signal, the existence of the foreign substance located between the transmission pad 14 and the reception pad 21.

The mixer 240 may mix the first output signal and the second output signal.

The processor 271 may determine, based on an output signal from the mixer 240, whether a foreign substance is located between the transmission pad 14 and the reception pad 21.

Figure 21:
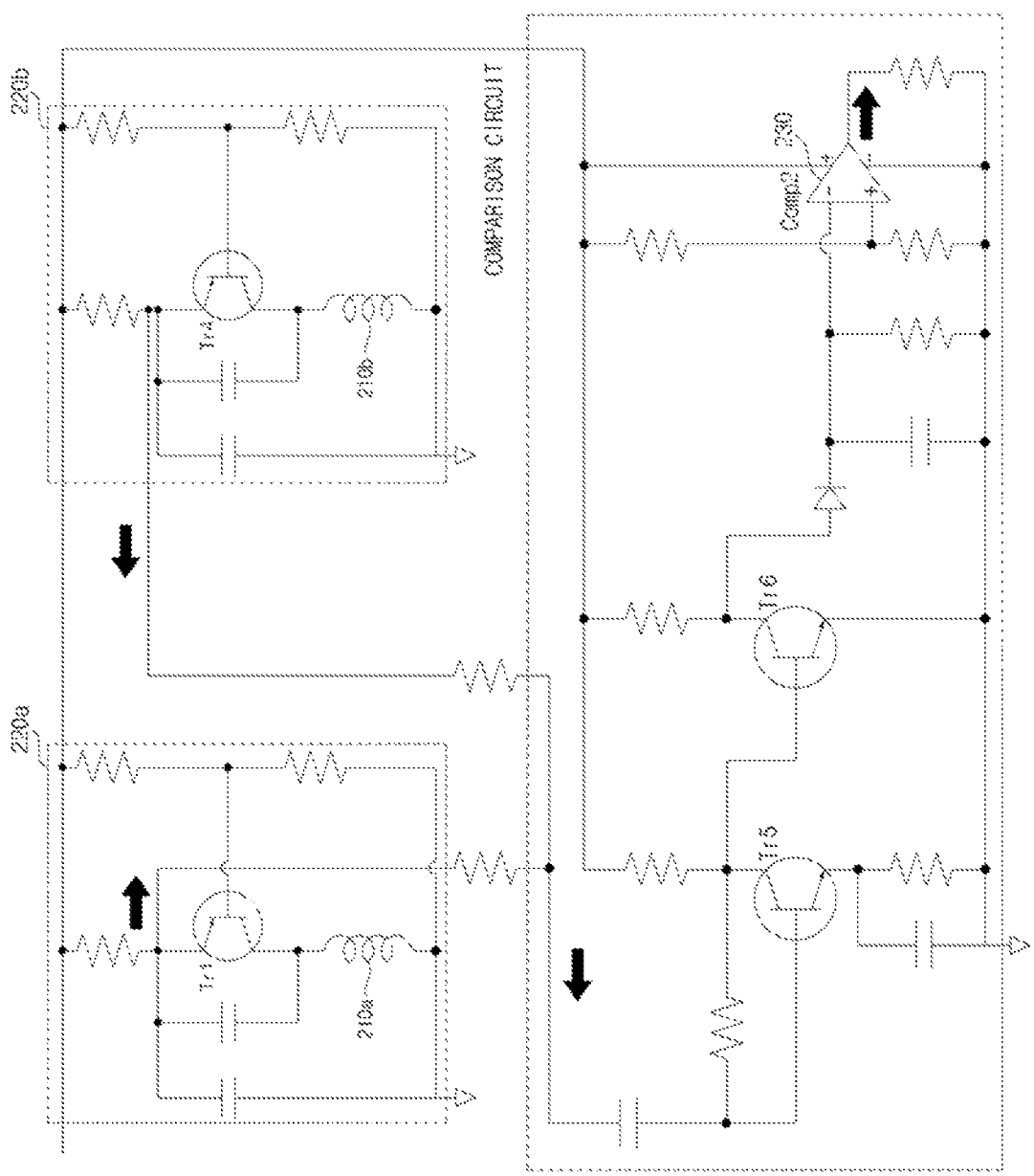
FIG. 21 is a diagram for explaining circuit configuration of an oscillator circuit and a comparison circuit according an embodiment of the present invention.

FIG. 21 is a diagram for explaining circuit configuration of an oscillator circuit and a comparison circuit according to an embodiment of the present invention.

Referring to FIG. 21, a Colpitts oscillator may be used as the first oscillator 220a and the second oscillator 220b.

In some implementations, the first oscillator 220a and the second oscillator 220b may be configured as an oscillator including a BJT or an OP Amp.

The first and second oscillator 220a and 220b may generate the same AC signal.

If a metal foreign substance approaches one 210a of the plurality of first coil parts, equivalent impedance of the corresponding first coil part 210a may change.

In this case, a first output signal from the first oscillator 220a and a second output signal from the second oscillator 220b do not coincide with each other.

If a foreign substance approaches the other one 210b of the plurality of first coil parts, equivalent impedance of the corresponding first coil part 210b may change.

In this case, a first output signal from the first oscillator 220a and a second output signal from the second oscillator 220b do not coincide with each other.

If a metal foreign substance exists around one of the plurality of the first coil parts 210a and 210b, an output from the comparator 230b may be have a beat waveform after with the first output signal and the second output signal are added to the output from the comparator 230b.

Figure 22:
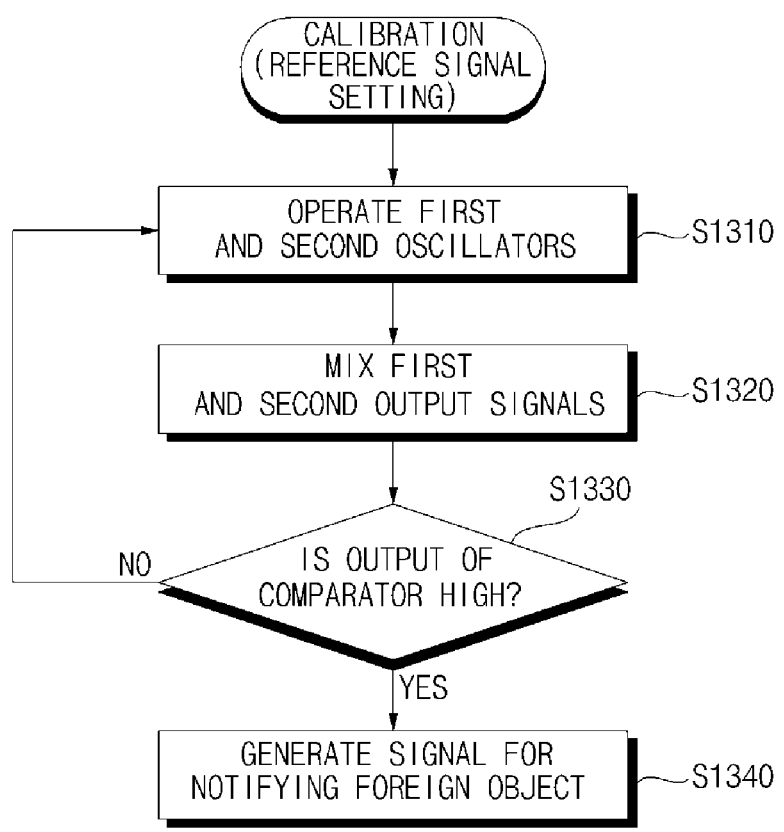
FIG. 22 is a flowchart illustrating operation of a foreign object detector according to an embodiment of the present invention.

FIG. 22 is a flowchart illustrating operation of a foreign object detector according to an embodiment of the present invention.

Referring to FIG. 22, the processor 271 may perform calibration on a reference signal.

The processor 271 may perform control to operate the first and second oscillators 220a and 220b in S1310.

The mixer 240 may mix first and second output signals in S1320.

If there is change in impedance in any one of the plurality of the first coil parts 210a and 210b, a mixed output signal may have a beat frequency.

The comparator 230 may determine whether there is a difference by comparing the reference signal and the mixed output signal in S1330.

The reference signal is a signal which is a result of synthesizing reference signals of the first and second oscillators 220a and 220b.

When it is determined that there is change in the impedance components, the processor 271 may generate a signal for alarming in S1340.

Figure 23:
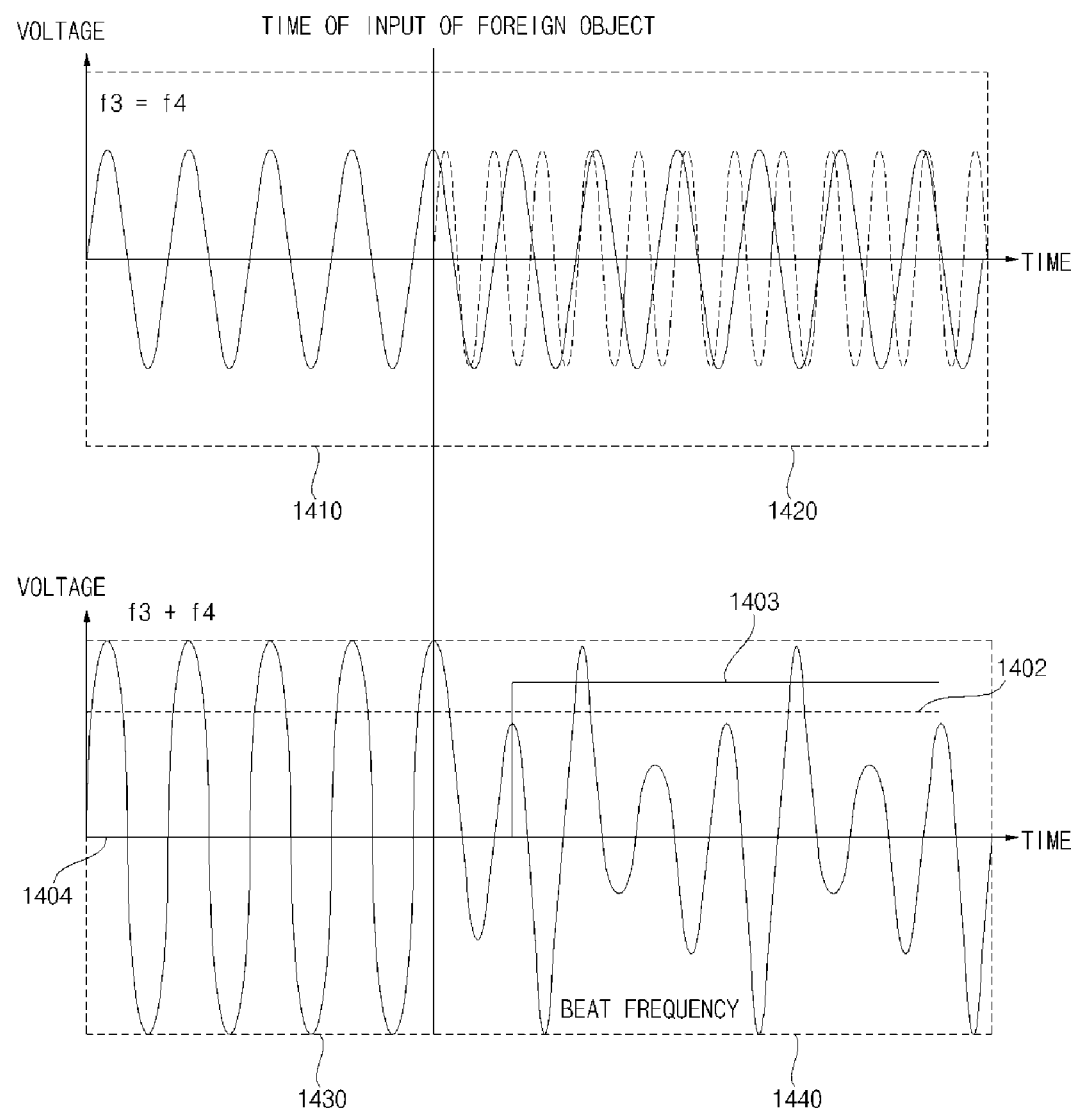
FIG. 23 is a diagram for explaining a first output signal, a second output signal, and a mixed signal according to an embodiment of the present invention.

FIG. 23 is a diagram for explaining a first output signal, a second output signal, and a mixed signal according to an embodiment of the present invention.

Referring to 23, reference numeral 1410 shows a first output frequency and a second output frequency in the case where no metal foreign substance exists around the plurality of first coil parts 210a and 210b.

Reference numeral 1420 shows a first output frequency and a second output frequency in the case where a metal foreign substance exists around one of the plurality of first coil parts 210a and 210b.

Reference numeral 1430 shows a first output frequency and a second output frequency in the case where no foreign substance exists around the plurality of first coil parts 210a and 210b. Reference numeral 1430 may be understood as a reference frequency.

Reference numeral 1440 shows a first output frequency and a second output frequency in the case where a metal foreign substance exists around any one of the plurality of first coil parts 210a and 210b.

As shown in the example indicated by reference numeral 1440, when a metal foreign substance exists around any one of the plurality of first coil parts 210a and 210b, a mixed frequency of the first and second output frequencies has a beat frequency.

In this case, the comparator 230 may compare a mixed frequency 1440 output from the mixer 240 and a reference frequency 1430 to generate a first signal (high signal) 1430 and a second signal (low signal) 1404.

Figure 24:
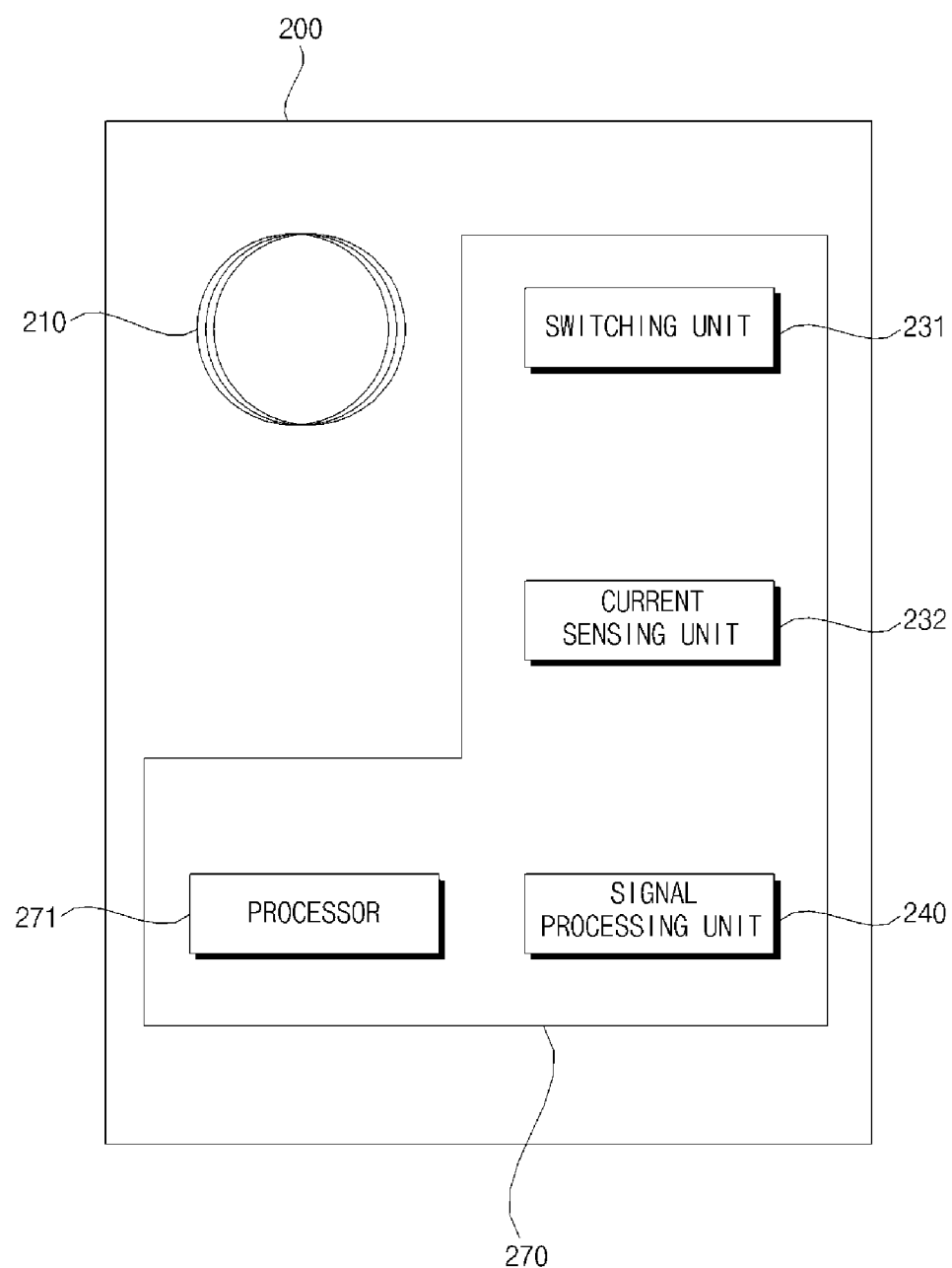
FIG. 24 is a diagram illustrating a foreign object detector according to an embodiment of the present invention.

FIG. 24 is a diagram illustrating a foreign object detector according to an embodiment of the present invention.

Referring to FIG. 24, the detection circuit 270 may be electrically connected to the first coil part 210.

As described above, the first coil part 210 includes a plurality of first coil parts.

The detection circuit 270 may include a switching unit 231, a current sensing unit 232, a signal processing unit 240, and a processor 271.

The foreign object detector 200 may further include a power supply unit.

The power supply unit may supply DC power (DC).

The first coil part 210, the switching unit 231, the current sensing unit 232, the signal processing unit 240, and the processor 271 may be electrically connected to each other.

The first coil part 210 may have a predetermined impedance. If a metal foreign substance is located around the first coil part 210, a change occurs in the impedance of the first coil part 210 from an outside perspective.

The switching unit 231 may be provided between DC power and the first coil part 210.

The switching unit 231 may control connection between the DC power and the first coil part 210.

The foreign object detector 200 may further include a free wheeling diode.

The free wheeling diode may be connected in parallel with the first coil part 210.

The switching unit 231 may include a Metal Oxide Semiconductor Field Effect Transistor (MOSFET) which is controlled based on a Pulse Width Modulation (PMW) signal.

The switching unit 231 may be provided as many as the number of the first coil parts 210

For example, the switching unit 231 may include a first switch and a second switch.

The first switch may be provided between the DC power and any one first coil part 210a of the plurality of first coil parts.

The second switch may be provided between the DC power and the other one 210b of the plurality of first coil parts.

The plurality of switches included in the switching unit 2331 may be synchronized so that the plurality of switches may be turned on or off.

The current sensing unit 231 may sense change in a current flowing in the first coil part 210 in response to the switching unit 231 being turned on and off.

The current sensing unit 232 may include a sensing resistance. In this case, the sensing resistance may be connected in series with the first coil part 210.

The current sensing unit 232 may include a Hall element.

The current sensing unit 232 may be provided as many as the number of first coil parts 210.

For example, the current sensing unit 232 may include a first sensor and a second sensor.

The first sensor may sense a value of a current flowing in one 210a of the plurality of first oil parts.

The second sensor may sense a value of a current flowing in the other one 210b of the plurality of first coil parts.

The signal processing unit 240 may generate a second signal by processing a first signal generated by the current sensing unit 232.

The first signal may be described as a change in a current flowing in the first coil part 210 due to repeated switching between connection and disconnection of the first coil part 210 to the DC power.

The first signal may be a signal in the form of a RL transient response.

The second signal may be defined as a value obtained by integrating the first signal for a predetermined period of time.

The second signal may be defined as a peak value of the first signal.

The second signal may be defined as an average value of the first signal.

The signal processor 240 may include a comparator.

Meanwhile, the signal processor 240 may be configured to include an analog circuit, a digital circuit using a microprocessor, or a combination of the analog circuit and the digital circuit.

The comparator may compare the first signal and a reference signal.

For example, when there is difference between the first signal and the reference signal, the comparator may generate a third signal.

For example, when there is no difference between the first signal and the reference signal, the comparator may generate a fourth signal.

For example, when the first signal is equal to or greater than a reference value, the comparator may generate the third signal.

For example, when the first signal is smaller than the reference value, the comparator may generate the fourth signal.

For example, when the first signal is equal to or smaller than the reference value, the comparator may generate the third signal.

For example, the comparator may generate the fourth signal when the first signal is greater than the reference value.

The third signal may be a high signal, which is a DC signal, and the fourth signal may be a low signal, which is a DC signal.

The third signal may be a low signal, which is a DC signal, and the fourth signal may be a high signal, which is a DC signal.

The signal processing unit 240 may be provided as many as the number of the first coil parts 210.

For example, the signal processing unit 240 may include a first signal processing unit and a second signal processing unit.

The first signal processing unit may process a signal generated in the first sensor.

The second signal processing unit may process a signal generated in the second sensor.

The processor 271 may be electrically connected to each constituent element of the foreign object detector 200.

The processor 271 may control each constituent element of the foreign object detector 200.

The processor 271 may determine, based on the second signal processed in the signal processing unit 240, existence of a foreign substance located between the transmission pad 14 and the reception pad 21.

When it is determined that a foreign substance exists between the transmission pad 14 and the reception pad 21, the processor 271 may generate a signal for outputting an alarm.

In some implementations, the foreign object detector 200 may further include an additional alarming unit.

The processor 271 may perform control so that the alarming unit to output an alarm.

The processor 271 may provide a control signal to a user interface apparatus so that an alarm is output through the user interface apparatus.

The processor 271 may provide, to the wireless charging system 100, a signal for stopping wireless charging.

In some implementations, the processor 270 may function as the signal processing unit 240.

When the third signal is received from the comparator, the processor 271 may determine that a foreign substance exists between the transmission pad 14 and the reception pad 21.

Meanwhile, the foreign object detector 200 may further include a memory.

The memory may include a reference value which will be described later.

In some implementations, the memory may be classified as a subordinate element of the processor 271.

Figure 25:
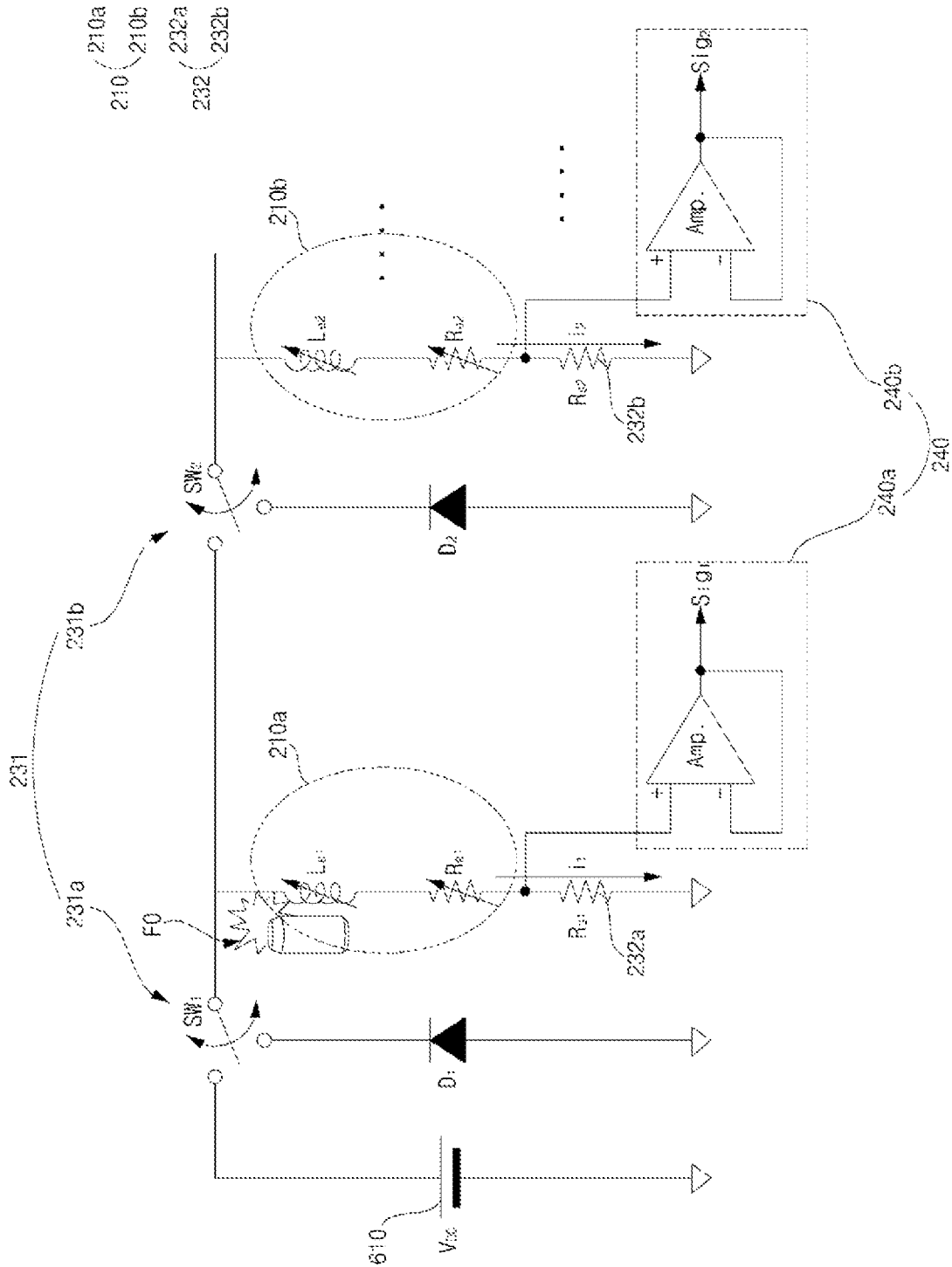
FIG. 25 is a diagram for explaining a foreign object detector according to an embodiment of the present invention.

FIG. 25 is a diagram for explaining a foreign object detector according to an embodiment of the present invention.

Referring to FIG. 25, the first coil part 210 may include a plurality of first coil parts 210*a* and 210*b*.

One 210*a* of the plurality of first coil parts and the other one 210*b* in may be connected in parallel with each other.

In a general situation, one 210*a* of the plurality of first coil parts, and the other 210*b* thereof may have the same impedance.

The first coil part 210 may be represented by an inductor and resistance.

When a metal foreign substance FO is located around the first coil part 210, an impedance of the first coil part 210 changes from an outside perspective.

For example, when the metal foreign substance is located around one 210*a* of the plurality of first coil parts, an impedance of one 210*a* of the plurality of first coil parts changes.

For example, an inductance of one 210*a* of the plurality of first coil parts may change due to the nearby metal foreign substance FO For example, resistance of one 210*a* of the plurality of first coil parts may change due to the nearby metal foreign substance FO.

The switching unit 231 may be provided between DC power 610 and the first coil part 210.

The switching unit 231 may include a first switch 231*a* and a second switch 231*b*.

The first switch 231*a* may be provided between the DC power 610 and one 210*a* of the plurality of first coil parts.

The second switch 231*b* may be provided between the DC power 610 and the other one 210*b* of the plurality of first coil parts.

In some implementations, the foreign object detector 200 may further include free wheel diodes D1 and D2.

The free wheel diodes D1 and D2 may be provided as many as the number of the first coil parts 210.

A first free wheel diode D1 may be connected in parallel with one 210*a* of the plurality of the first coil part.

When turned on, the first switch 231*a* may connect one 210*a* of the plurality of first coil parts and the DC power 610.

When turned off, the first switch 231*a* may connect one 210*a* of the plurality of first coil parts and the first free wheel diode D1.

The second free wheel diode D2 may be connected to in parallel with the other one 210*b* of the plurality of first coil parts.

When turned on, the second switch 231*b* connects the other one 210*b* of the plurality of first coil parts and the DC power 610.

When turned off, the second switch 231*b* connected the other one 210*b* of the plurality of first coil parts and the second free wheel diode D2.

The current sensing unit 232 may be connected in series with the first coil part 210.

In the case where the current sensing unit 232 is configured as a current sensing resistance, voltages at both ends of the current sensing resistance may be input to the signal processing unit 240.

The current sensing unit 232 may include a first sensor 232*a* and a second sensor 232*b*.

The first sensor 232*a* may sense a value of a current flowing in one 210*a* of the plurality of first coil parts.

The first sensor 232*a* may be connected in series with any one 210*a* of the plurality of first coil parts.

The second sensor 232*b* may sense a value of a current flowing in the other one 210*b* of the plurality of first coil parts.

The second sensor 232*b* may be connected in series with the other one 210*b* of the plurality of first coil parts.

The signal processing unit 240 may be connected to a node which is located between the first coil part 210 and the current sensing unit 232.

The signal processing unit 240 may include a first signal processing unit 240*a* and a second signal processing unit 240*b*.

The first signal processing unit 240*a* may process a signal processed in the first sensor 232*a*.

The first signal processing unit 240*a* may be connected to a node which is formed between one 210*a* of the plurality of first coil parts and the first sensor 232*a*.

The second signal processing unit 240*b* may process a signal generated in the second sensor 232*b*.

The second signal processing unit 240*b* may be connected to a node which is formed between the other one 210*b* of the plurality of first coil parts and the second sensor 232*b*.

In some implementations, the processor 271 may compare a signal generated in the first sensor 232*a* and a signal generated in the second sensor 232*b* to determine existence of a foreign substance depending on whether there is difference between the signals.

Figure 26:
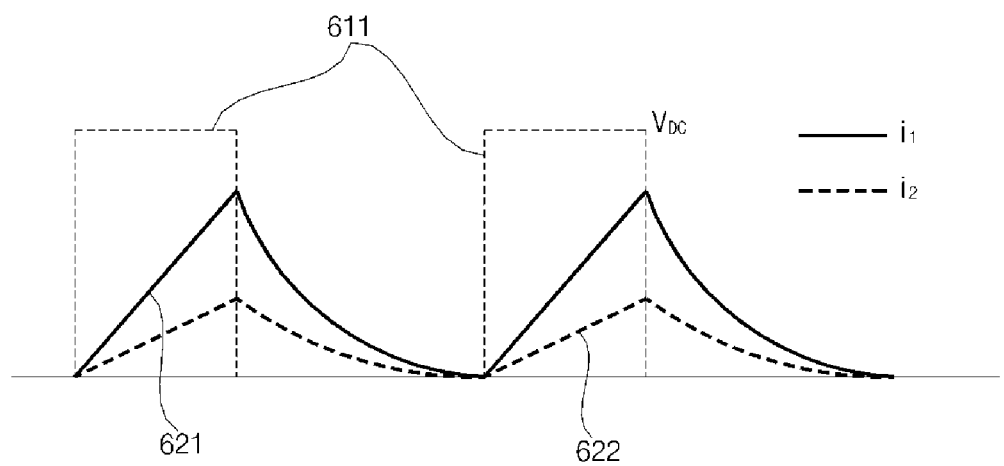
FIG. 26 is a diagram for explaining a first signal according to an embodiment of the present invention.

FIG. 26 is a diagram for explaining a first signal according to an embodiment of the present invention.

Referring to FIG. 26, DC power is applied to the first coil part 210.

For example, square-wave DC power 611 may be applied to the first coil part 210.

If a metal foreign substance exists around the first coil part 210, a signal having a waveform indicated by reference numeral 621 may be generated in the current detecting 232.

If no foreign substance exists around the first coil part 210, the current sensing unit 232 may generate a signal having a waveform indicated by reference numeral 622 may be generated I the current sensing unit 232.

In FIG. 25, a metal foreign substance FO is located around one 210*a* of the plurality of first coil parts, and thus, the first sensor 232*a* obtains a waveform indicated by reference numeral 621 in FIG. 26.

In FIG. 26, no metal foreign substance is located around the other one 210b of the plurality of first coil parts, and thus, the second sensor 232b obtains a waveform indicated by reference numeral 622 in FIG. 26.

The waveforms shown in FIG. 26 are merely theoretic examples for a specific condition, and waveform characteristics may reverse between the cases where a foreign substance is present and absence, depending on an actual measuring process and physical properties of the foreign substance.

Figure 27:
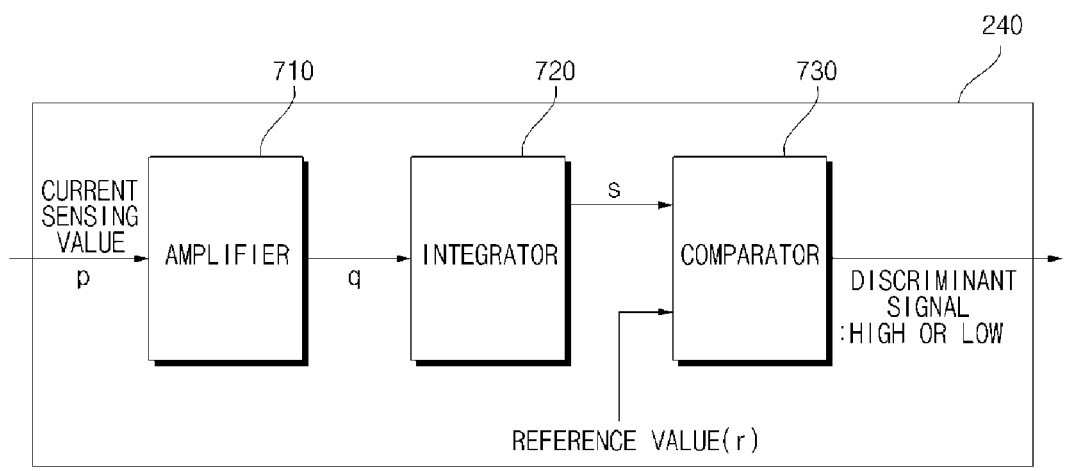
FIG. 27 is a diagram for explaining a signal processing unit according to an embodiment of the present invention.

FIG. 27 is a diagram for explaining a signal processing unit according to an embodiment of the present invention.

Figure 28:
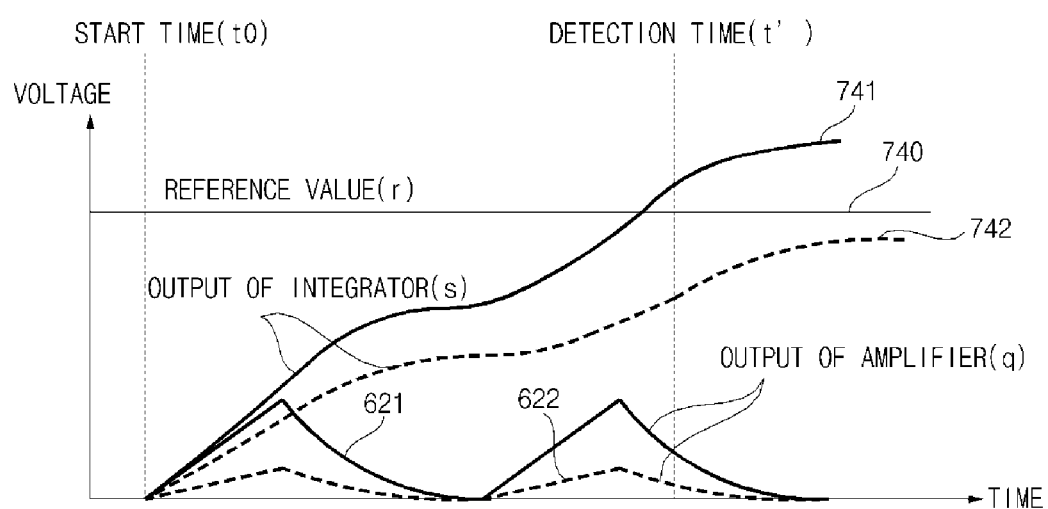
FIG. 28 is a diagram for explaining a signal processed in the signal processor shown in FIG. 27.

FIG. 28 is a diagram for explaining a signal processed in the signal processor shown in FIG. 27.

Referring to FIGS. 27 and 28, the signal processor 240 may process a first signal, generated in the current sensing unit 232, to generate a second signal.

The signal processing unit 240 may include an amplifier 710, an integrator 720, and a comparator 730.

The amplifier 710 may output an amplified signal by amplifying the first signal.

The amplifier 710 may perform noise filtering on the first signal.

The first signal amplified by the amplifier may be transferred to the integrator 720.

The integrator 720 may integer the first signal for a preset period of time.

The integrator 720 may output a second signal by integrating the first signal for the preset period of time.

Reference numerals 741 and 742 show examples of a second signal which is integrated for the predetermined period of time.

In particular, reference numeral 741 shows the case where a foreign substance exists around the first coil part 210, and reference numeral 742 shows the case where no foreign substance exists around the first coil part 210.

A detection coil has a different current value depending on existence and non-existence of a foreign substance, and this results in difference in speed by which an output of the integrator reaches a reference value. By setting an appropriate reference value in consideration of this characteristic, it is possible to detect a foreign substance.

An output signal from the integrator has an output voltage equal to or greater than a reference value 740 at a detection time t' in the case 741 where a foreign substance exists. On the contrary, an output signal from the integrator has an output voltage smaller than the reference value 740 at the detection time t' in the case where 742 where no foreign substance exists.

Waveforms shown in FIG. 28 are merely theoretic examples for a specific condition, and waveform characteristics may reverse between the cases where a foreign substance is present and absence, depending on an actual measuring process and physical properties of the foreign substance.

The comparator 730 may compare an output value 741 of the integrator 720 and a reference value 740.

When the output value 741 of the integrator 720 is equal to or greater than the reference value 740, the comparator 730 may output a third signal.

When the third signal is received, the processor 271 may determine that a metal foreign substance exists around the first coil part 210.

When the output value 741 of the integrator 720 is smaller than the reference value 740, the comparator 730 may output a fourth signal.

When the fourth signal is received, the processor 271 may determine that no metal foreign substance exists around the first coil part 210.

Meanwhile, the reference value 740 may be a value that is set through tests on a current flowing in the first coil part 210 when no foreign substance exists. The reference value 740 may be a value that is set based on a value obtained by integrating a current signal flowing in the first coil part 210 for a preset period of time.

Due to the above-described detection technique, even a very small change in a current value due to presence of a foreign substance may be detected using integration, and therefore, foreign object detection sensitivity may improve.

Figure 29:
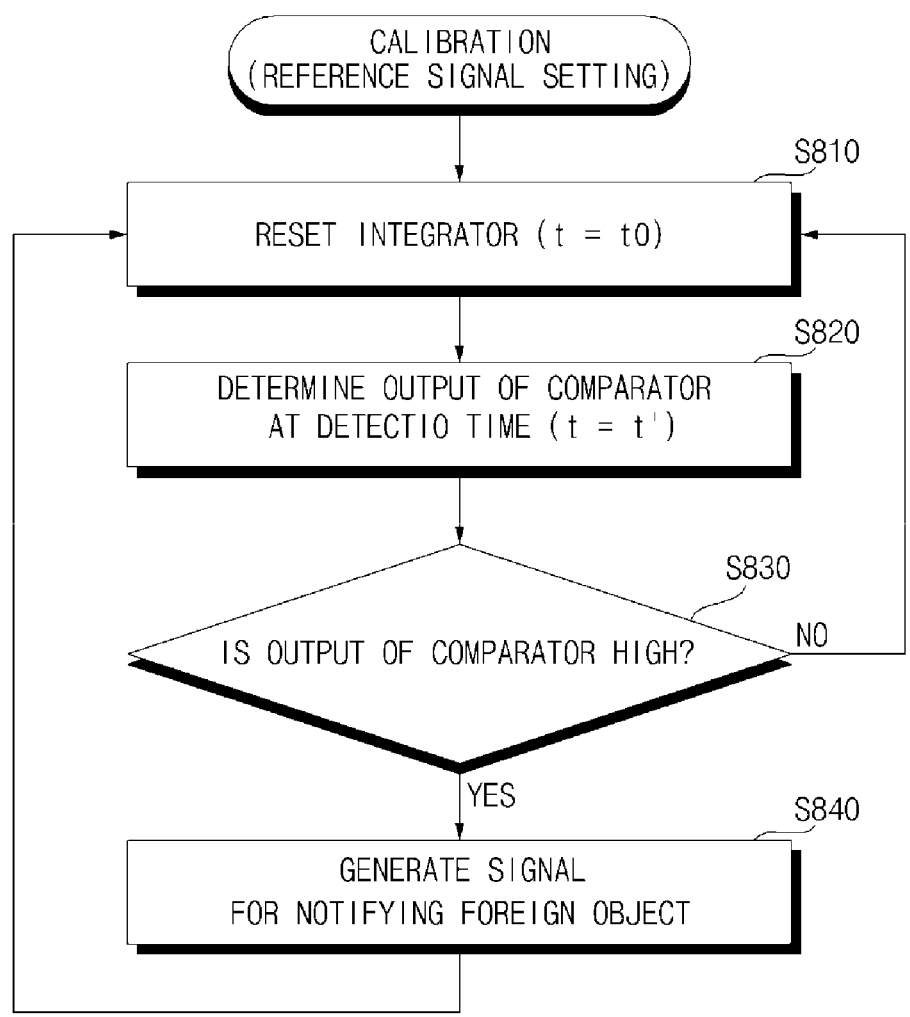
FIG. 29 is a flowchart for explaining operation of a foreign object detector according to an embodiment of the present invention.

FIG. 29 is a flowchart for explaining operation of a foreign object detector according to an embodiment of the present invention.

Referring to FIG. 29, the processor 271 may perform calibration. The processor 271 may set a reference value.

The processor 271 may reset the integrator 720 in S810.

For a foreign substance detecting technique in which the integrator 720 is employed, resetting operation is required before and after detection of a foreign substance in order to prevent saturation of an output signal of the integrator 720 (e.g., a phenomenon where the maximum value of an output signal from an amplifier is restricted to a supplied voltage).

When no foreign substance exists at a detection time a predetermined period of time after an integrator reset time to, the comparator 730 may output a fourth signal (e.g., a low signal), and, when a foreign substance exists at the detection time, the comparator may output a third signal (e.g., a high signal) in S820.

In some implementations, the third signal may be a low signal, and the fourth signal may be a high signal.

The processor 271 may determine whether a signal received from the comparator 720 is a high signal in S830.

When it is determined that the received signal is a high signal, the processor 271 may generate a signal for outputting an alarm and provide the signal in S840.

Then, the processor 271 resets the integrator 720 and repeatedly performs an operation of detecting a foreign substance.

Figure 30:
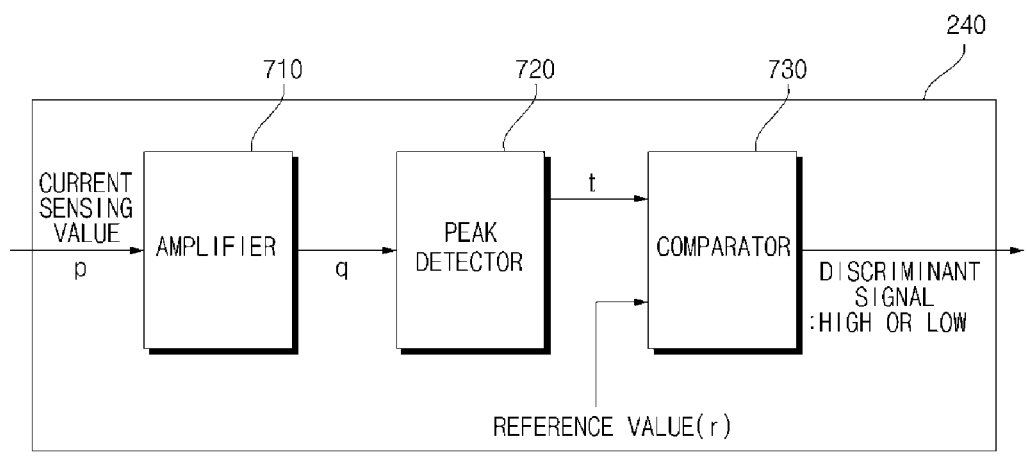
FIG. 30 is a diagram for explaining a signal processing unit according to an embodiment of the present invention.

FIG. 30 is a diagram for explaining a signal processing unit according to an embodiment of the present invention.

Figure 31:
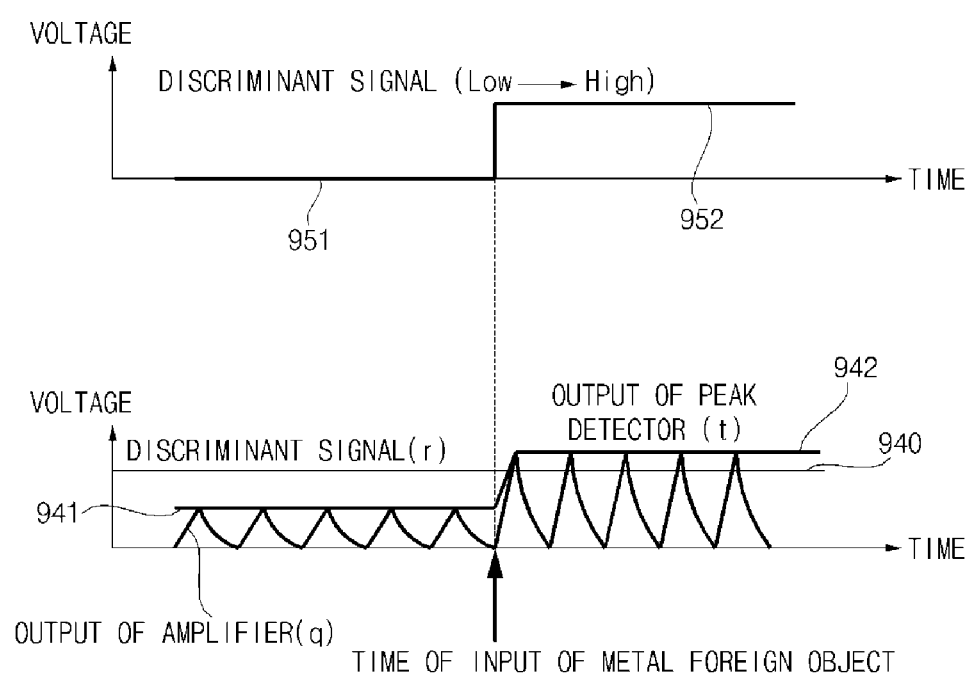
FIG. 31 is a diagram for explaining a signal processed in the signal processor shown in FIG. 30.

FIG. 31 is a diagram for explaining a signal processed in the signal processor shown in FIG. 30.

Referring to FIGS. 30 and 31, the signal processor 240 may generate a second signal by processing a first signal generated in the current sensing unit 232.

The signal processor 240 may include an amplifier 710, a peak detector 721, and a comparator 730.

The amplifier 710 may output an amplified signal by amplifying a first signal.

The amplifier 710 may filter out noise from the first signal.

The first signal amplified by the amplifier may be transferred to the peak detector 721.

The peak detector 721 may detect a peak value of the first signal.

The peak detector 721 may output a second signal by detecting the peak value of the first signal.

Reference numerals 941 and 942 show examples of a second signal generated by the peak detector 721.

When a foreign substance exists, a peal value of a sensing-value waveform changes due to change in an inductance of the first coil part 210. By setting a reference value in consideration of the aforementioned characteristic, it is possible to detect a foreign substance.

The comparator 730 may compare an output value 941 or 942 of the peak detector 721 and a reference value 940.

When the output value 942 of the peak detector 721 is equal to or greater than the reference value 940, the comparator 730 may output a third signal.

When the third signal is received, the processor 271 may determine that a metal foreign substance exists around the first coil part 210.

When the output value 941 of the peak detector 721 is smaller than the reference value 940, the comparator may output a fourth signal.

When the fourth signal is received, the processor 271 may determine that no metal foreign substance exists around the first coil part 210.

Meanwhile, the reference value 940 may be a value that is set through tests on a current flowing in the first coil part 210 when no foreign substance exists. The reference value 940 may be a value that is set based on a peak value of a current flowing in the first coil part 210.

Figure 32:
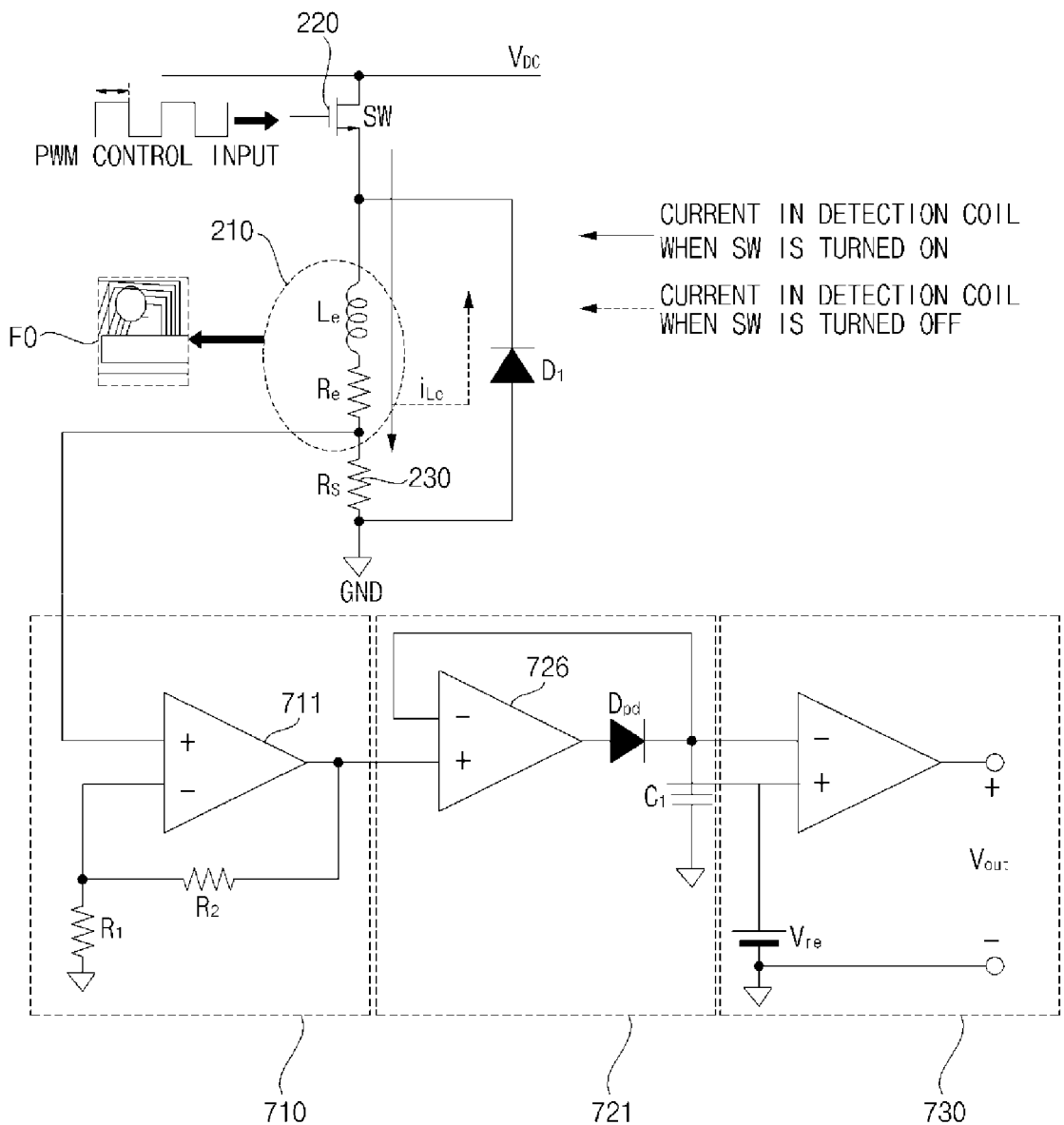
FIG. 32 is an example of a circuit diagram illustrating a foreign object detector including the signal processing unit shown in FIG. 30.

FIG. 32 is an example of a circuit diagram illustrating a foreign object detector including the signal processing unit shown in FIG. 30.

FIG. 32 is a circuit diagram illustrating a foreign substance apparatus that is implemented using an analog circuit.

Referring to FIG. 32, the first coil part 210 may be connected to or disconnected from DC power (VDC) through a MOSFET (SW) 231.

When the SW 231 is turned off and on, a current in a detection coil flows through the free wheel diode D1.

A current sensing resistance Rs 232 is connected in series with the detection coil, and voltages at both ends of a sensing resistance is input to the signal processing unit 240.

The signal processing unit 240 may include two operational amplifiers and one comparator 730.

The amplifier 710 may include a first operational amplifier 711, a first resistance R1, and a second resistance R2.

The first operational amplifier 711 may amplify a relatively small current measurement by a ratio of the first resistance R1 to the second resistance R2, and, when noise is great, the first operational amplifier 711 may add capacitors at both ends of the first resistance R1 or the second resistance R2 to perform a filtering function.

The peak detector 721 may include a second operational amplifier 726, a diode Dpd, and a capacitor 1.

In some implementations, in the case where a signal loss occurring due to a forward directional voltage of Dpd is ignorable (e.g., use of a short key diode), the second operational amplifier 726 may use a general RCD peak detector circuit from which the peak detector 721 is removed and in which resistance is connected in series with the capacitor C1 to have a time constant sufficiently greater than a switching cycle of the SW 210.

The comparator 730 may input a reference value Vref to a positive input terminal (+), compare the reference value Vref with an output of the peak detector 721, and generate a discriminant signal Vout.

Figure 33:
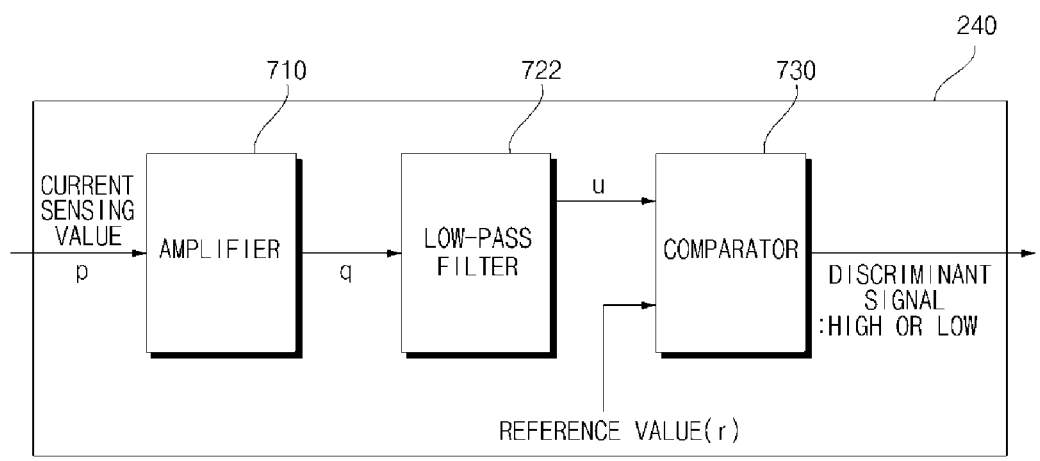
FIG. 33 is a diagram for explaining a signal processing unit according to an embodiment of the present invention.

FIG. 33 is a diagram for explaining a signal processing unit according to an embodiment of the present invention.

Figure 34:
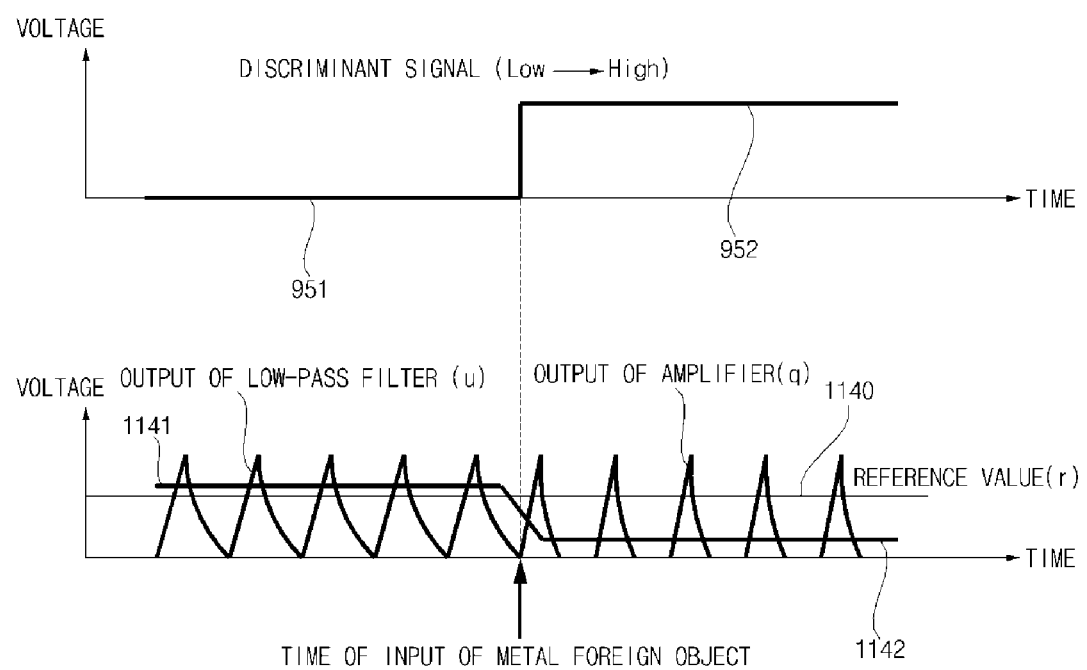
FIG. 34 is a diagram for explaining a signal processed in the signal processing unit shown in FIG. 33.

FIG. 34 is a diagram for explaining a signal processed in the signal processing unit shown in FIG. 33.

Referring to FIGS. 33 and 34, the signal processor 240 may generate a second signal by processing a first signal processed by the current sensing unit 232.

The signal processing unit 240 may include an amplifier 710, a low-pass filter 722, and a comparator 730.

The amplifier 710 may output an amplified signal by amplifying the first signal.

The amplifier 710 may perform noise filtering on the first signal.

The first signal amplified by the amplifier 710 may be transferred to the low-pass filter 722.

The low-pass filter 722 may extract an average value of the first signal.

The low-pass filter 722 may output a second signal by extracting the average value of the first signal.

Reference numerals 1141 and 1142 show examples of a second signal generated by the low-pass filter 722.

When a foreign substance exists, equivalent resistance of the first coil part 210 may increase and thus an average of a waveform of a sensing value sensed by the current sensing unit 232 may be reduced as expressed in the following equation.

$$\text{Average Current of Detection Coil} = \frac{\text{Valid Input Voltage}}{\text{Euivalent Resistance of Detection Coil}} \quad \text{[Equation]}$$

The comparator 730 may compare an output value 1141 or 1142 of the low-pass filter 722 with a reference value 1140

When the output value 1141 of the low-pass filter 722 is greater than the reference value 1140, the comparator 730 may output a fourth signal.

When the fourth signal is received, the processor 271 may determine that no metal foreign substance exists around the first coil part 210.

When the output value 1142 of the low-pass filter 722 is equal to or smaller than the reference value 1140, the comparator 730 may output a third signal.

When the third signal is received, the processor 271 may determine that a foreign substance exists around the first coil part 210.

Meanwhile, the reference value 1140 may be a value that is set through tests on a current flowing in the first coil part 210 when no foreign substance exists. The reference value 1140 may be a value that is set based on an average value of the current flowing in the first coil part 210.

Figure 35:
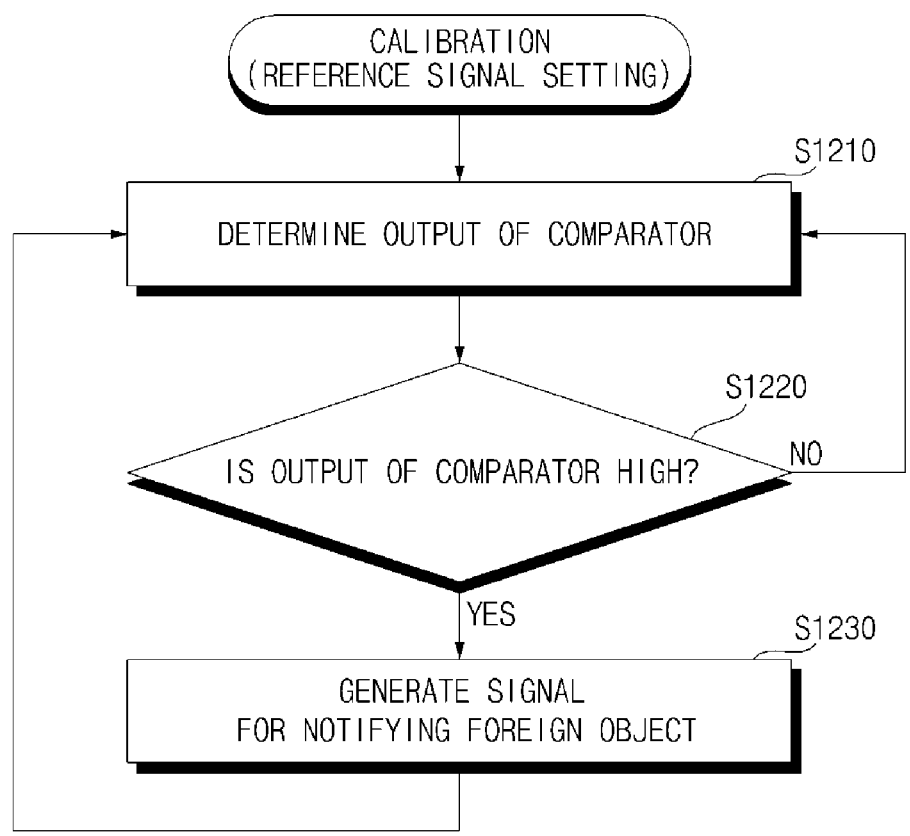
FIG. 35 is a flowchart for explaining operation of a foreign object detector according to an embodiment of the present invention.

FIG. 35 is a flowchart for explaining operation of a foreign object detector according to an embodiment of the present invention.

Referring to FIG. 35, the processor 271 may perform calibration. The processor 271 may set a reference value.

The comparator 730 may output a fourth signal (e.g., a low signal) in response to non-existence of any foreign substance, and a third signal (e.g., a high signal) in response to existence of any foreign substance in S1210.

In some implementations, the third signal may be a low signal, and the fourth signal may be a high signal.

The processor 271 may determine whether a signal received from the comparator 730 is a high signal in S1231.

When it is determined that the received signal is a high signal, the processor 271 may generate a signal for outputting an alarm and provide the signal in S1232.

Then, the processor 271 resets the integrator 720 and repeatedly performs an operation of detecting a foreign substance.

The present invention as described above may be implemented as code that can be written on a computer-readable medium in which a program is recorded and thus read by a computer. The computer-readable medium includes all kinds of recording devices in which data is stored in a computer-readable manner Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A foreign object detector for detecting a foreign object between a transmission pad and a reception pad of a wireless charging system, the foreign object detector comprising:
   a plurality of object detectors connected in series or in parallel with one another; and
   a detection circuit configured to detect an object based on data received from the plurality of object detectors,
   wherein each of the plurality of object detectors includes:
      a first coil part including a coil wound in a first rotation direction; and
      a second coil part stacked on the first coil part and including a coil wound in a second rotation direction different from the first rotational direction, and
   wherein a stacked order of a first coil part and a second coil part of at least one object detector among the plurality of object detectors is different from a stacked order of a first coil part and a second coil part of another object detector among the plurality of object detectors.

2. The foreign object detector according to claim 1, wherein the plurality of object detectors include:
   a first group of object detectors; and
   a second group of object detectors connected in parallel with the first group of object detectors.

3. The foreign object detector according to claim 2, wherein adjacent object detectors in the first group of object detectors are connected in series with each other, and
   wherein adjacent object detectors in the second group of object detectors are connected in series with each other.

4. The foreign object detector according to claim 3, wherein the second group of object detectors are disposed to be engaged with the first group of object detectors.

5. The foreign object detectors according to claim 4, wherein the first group of object detectors includes:
   a first object detector;
   a second object detector disposed adjacent to the first object detector in a first direction; and
   a third object detector disposed adjacent to the first object detector in a second direction.

6. The foreign object detector according to claim 5, wherein the first group of object detectors are aligned with the second object detector and the third object detector being aligned in a shape of "∟" with reference to the first object detector.

7. The foreign object detector according to claim 4, wherein the second group of object detectors includes:
   a fourth object detector;
   a fifth object detector disposed adjacent to the fourth object detector in a direction opposite to the first direction; and
   a sixth object detector disposed adjacent to the fourth object detector in a direction opposite to the second direction.

8. The foreign object detector according to claim 7, wherein the second group of object detectors are aligned with the fifth object detector and the sixth object detector being aligned in a shape of "⌐" with reference to the fourth object detector.

9. The foreign object detector according to claim 2, wherein the plurality of object detectors include:
   a first layer composed of a combination of at least some of a plurality of first coil parts of the plurality of object detectors and some of a plurality of second coil parts of the plurality of object detectors; and
   a second layer composed of a combination of remaining first and second coil parts among the plurality of objects, the remaining first and second coil parts not being used to form the first layer among the plurality of first coil parts and the plurality of second coil parts,
   wherein the second layer is disposed on the first layer.

10. The foreign object detector according to claim 1, further comprising:
    a first port electrically connected to the plurality of object detectors; and
    a second port electrically connected to the plurality of object detectors.

11. The foreign object detector according to claim 10, wherein the first port and the second port are disposed outside a boundary of the transmission pad.

12. The foreign object detector according to claim 1, wherein a number of turns in a first coil part of at least one object detector among the plurality of object detectors is different from a number of turns in a first coil part of another object detector among the plurality of object detectors.

13. The foreign object detector according to claim 1, wherein an induced voltage of at least one object detector among the plurality of object detectors has a polarity opposite to a polarity of an induced voltage of another object detector among the plurality of object detectors.

14. The foreign object detector according to claim 1, wherein a coil in the first coil part is wound a number of times which is greater than a number of times a coil in the second coil part is wound.

15. The foreign object detector according to claim 1, wherein a first shape defined by coil windings in the first coil part is smaller than a second shape defined by coil windings in the second coil part.

16. The foreign object detector according to claim 1, wherein the first coil parts of the plurality of object detectors and the second coil parts of the plurality of object detectors are alternatively arranged.

17. The foreign object detector according to claim 1, wherein the first coil part of each of the plurality of object detectors is wider than the second coil part of each of the plurality of object detectors.

18. The foreign object detector according to claim 1, wherein a center of the first coil part is aligned with a center of the second coil part in each of the plurality of object detectors.

19. A wireless charging apparatus comprising:
a transmission pad configured to wirelessly transmit power; and
a plurality of foreign object detectors disposed on the transmission pad,
wherein each of the plurality of foreign object detectors includes:
a plurality of object detectors connected in series or in parallel with one another, and
a detection circuit configured to detect that an object exists between the transmission pad and a reception pad of a wireless charging system based on data received from the plurality of object detectors, and
wherein each of the plurality of object detectors includes:
a first coil part including a coil wound in a first direction, and
a second coil part stacked on the first coil part and including a coil wound in a second direction different from the first direction, and
wherein a stacked order of a first coil part and a second coil part of at least one object detector among the plurality of object detectors is different from a stacked order of a first coil part and a second coil part of another object detector among the plurality of object detectors.

20. A foreign object detector for detecting a foreign object between a transmission pad and a reception pad of a wireless charging system, the foreign object detector comprising:
a plurality of object detectors connected in series or in parallel with one another, each of the plurality of object detectors including:
a first coil part including a coil wound in a first rotation direction, and
a second coil part overlapping with the first coil part and including a coil wound in a second rotation direction different from the first rotational direction; and
a detection circuit configured to detect an object based on data received from the plurality of object detectors,
wherein a stacked order of a first coil part and a second coil part of at least one object detector among the plurality of object detectors is different from a stacked order of a first coil part and a second coil part of another object detector among the plurality of object detectors.

* * * * *